US012755444B2

(12) United States Patent
Norieda et al.

(10) Patent No.: US 12,755,444 B2
(45) Date of Patent: Oct. 6, 2026

(54) INFORMATION PROCESSING DEVICE, INFORMATION PROCESSING METHOD, AND COMPUTER-READABLE STORAGE MEDIUM

(71) Applicant: NEC Corporation, Tokyo (JP)

(72) Inventors: Shin Norieda, Tokyo (JP); Kenta Fukuoka, Tokyo (JP); Yoshiyuki Tanaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 123 days.

(21) Appl. No.: 18/684,895

(22) PCT Filed: Sep. 3, 2021

(86) PCT No.: PCT/JP2021/032504
§ 371 (c)(1),
(2) Date: Feb. 20, 2024

(87) PCT Pub. No.: WO2023/032170
PCT Pub. Date: Mar. 9, 2023

(65) Prior Publication Data
US 2025/0131610 A1 Apr. 24, 2025

(51) Int. Cl.
*G06F 21/32* (2013.01)
*G06T 11/00* (2006.01)
*G06V 40/16* (2022.01)

(52) U.S. Cl.
CPC .............. *G06T 11/00* (2013.01); *G06F 21/32* (2013.01); *G06V 40/172* (2022.01); *G06V 40/168* (2022.01)

(58) Field of Classification Search
CPC .......... G06F 21/32; G06F 18/22; G06F 3/011; G06T 19/00; G06T 17/00;
(Continued)

(56) References Cited

U.S. PATENT DOCUMENTS

2009/0195650 A1* 8/2009 Hanai ................... G06T 19/006 382/284
2010/0064359 A1* 3/2010 Boss ....................... H04L 63/08 726/7
(Continued)

FOREIGN PATENT DOCUMENTS

JP 2001-243179 A 9/2001
JP 2019-128683 A 8/2019

OTHER PUBLICATIONS

International Search Report for PCT Application No. PCT/JP2021/032504, mailed on Oct. 12, 2021.
(Continued)

*Primary Examiner* — Hau H Nguyen
(74) *Attorney, Agent, or Firm* — Sughrue Mion, PLLC

(57) ABSTRACT

One of the purposes of the present invention is to provide an information processing device which is capable of performing appropriate entry/exit management with respect to an arbitrary region in a virtual space. An information processing device according to one embodiment of this disclosure comprises: a reception means for receiving input of setting information indicating a region of a virtual space; a region control means for setting, as a specific region, the region of the virtual space indicated in the setting information; an authentication means for performing biometric authentication of a user that operates an avatar, if the avatar is to enter the specific region; and a determination means for determining whether to permit entry of the avatar into the specific region, according to results of the biometric authentication.

21 Claims, 15 Drawing Sheets

(58) Field of Classification Search
CPC ... G06T 2207/30201; G06T 7/00; G06T 7/11; G06T 13/40; G06V 40/168; G06V 40/50; G06V 40/173
See application file for complete search history.

(56) References Cited

U.S. PATENT DOCUMENTS

| | | | | |
|---|---|---|---|---|
| 2010/0134310 | A1* | 6/2010 | Zheng | G07C 9/25 340/5.2 |
| 2013/0007636 | A1 | 1/2013 | Boss et al. | |
| 2022/0109810 | A1* | 4/2022 | Kancharlawar | H04N 7/157 |

OTHER PUBLICATIONS

English translation of Written opinion for PCT Application No. PCT/JP2021/032504, mailed on Oct. 12, 2021.

* cited by examiner

Fig.6

| REGION IDENTIFICATION INFORMATION | REGION | DATE AND TIME | CONDITION | SETTING USER |
|---|---|---|---|---|
| 001 | ((x1, y1), (x2, y2)) | 7/14 15:00—16:00 | MANAGERIAL LEVEL OR ABOVE | USER A |
| 002 | CONFERENCE ROOM 1 | 7/20 14:00—16:30 | USER B<br>USER C<br>USER D | USER D |

Fig.8
START
IS THERE AVATAR THAT ATTEMPTS TO ENTER SPECIFIC REGION?
S201
Yes
No
IMAGE USER WHO OPERATES AVATAR
S202
ACQUIRE FACE FEATURE AMOUNT
S203
PERFORM FACE AUTHENTICATION BASED ON ACQUIRED FACE FEATURE AMOUNT AND FACE FEATURE AMOUNT IN AUTHENTICATION DB
S204
HAS USER BEEN AUTHENTICATED?
S205
Yes
No
IS CONDITION SATISFIED?
S206
Yes
No
ALLOW ENTRY OF AVATAR
S207
REJECT ENTRY OF AVATAR
S208
END

Fig.9

| AVATAR IDENTIFICATION INFORMATION | USER | ATTRIBUTE | |
|---|---|---|---|
| | | AFFILIATION | POSITION |
| ABC | USER A | SALES | CHIEF |
| DEF | USER B | DEVELOPMENT | DEPARTMENT HEAD |

INFORMATION PROCESSING DEVICE, INFORMATION PROCESSING METHOD, AND COMPUTER-READABLE STORAGE MEDIUM

This application is a National Stage Entry of PCT/JP2021/032504 filed on Sep. 3, 2021, the contents of all of which are incorporated herein by reference, in their entirety.

TECHNICAL FIELD

The present disclosure relates to a technology for controlling a virtual space.

BACKGROUND ART

There is a technology for a plurality of users to communicate in a virtual space. For example, Patent Literature 1 discloses a technology for constructing a virtual office (VR office) by combining a three-dimensional image or the like indicating a user with a virtual reality (VR) image of an office. At this time, in the technology disclosed in Patent Literature 1, an operation of moving a user in the VR office or communicating with another user in the VR office is performed.

CITATION LIST

Patent Literature

PTL 1: JP 2019-128683 A

SUMMARY OF INVENTION

Technical Problem

In the virtual space as described above, for example, the user moves in the virtual space by operating an avatar indicating the user or communicates with another user. Here, for a predetermined region of the virtual space, there are circumstances where user usage is restricted, such as a circumstance in which only an avatar of a specific user is allowed to enter the predetermined region of the virtual space. However, in the virtual space, it is not known whether the avatar is actually operated by the user associated to the avatar. That is, the user may use an avatar of another person. Therefore, it is required to perform appropriate entry/exit management so that another user other than the specific user allowed to use the predetermined region does not use the predetermined region.

Patent Literature 1 describes performing user authentication when a user enters the VR office. However, this is processing executed for the user to use the VR office, and is processing substantially similar to login processing for a system of the VR office. That is, Patent Literature 1 does not disclose performing entry/exit management for a region according to various circumstances in a virtual space for a user who has already used the virtual space.

The present disclosure has been made in view of the above problems, and an object of the present disclosure is to provide an information processing device and the like capable of performing appropriate entry/exit management for any region in a virtual space.

Solution to Problem

An information processing device according to an aspect of the present disclosure includes: reception means that receives an input of setting information which is information indicating restriction of an entry to a partial region of a virtual space; region control means that sets, as a specific region, the partial region indicated by the setting information; authentication means that performs biometric authentication of a user who operates an avatar in a case where the avatar attempts to enter the specific region; and determination means that determines whether to allow the avatar to enter the specific region according to a result of the biometric authentication.

An information processing method according to an aspect of the present disclosure includes: receiving an input of setting information which is information indicating restriction of an entry to a partial region of a virtual space; setting, as a specific region, the partial region indicated by the setting information; performing biometric authentication of a user who operates an avatar in a case where the avatar attempts to enter the specific region; and determining whether to allow the avatar to enter the specific region according to a result of the biometric authentication.

A computer-readable storage medium according to an aspect of the present disclosure stores a program for causing a computer to execute processing of: receiving an input of setting information which is information indicating restriction of an entry to a partial region of a virtual space; setting, as a specific region, the partial region indicated by the setting information; performing biometric authentication of a user who operates an avatar in a case where the avatar attempts to enter the specific region; and determining whether to allow the avatar to enter the specific region according to a result of the biometric authentication.

Advantageous Effects of Invention

According to the present disclosure, it is possible to perform appropriate entry/exit management for any region in a virtual space.

BRIEF DESCRIPTION OF DRAWINGS

FIG. 6 is a diagram illustrating an example of specific region information according to the second example embodiment of the present disclosure.

FIG. 9 is a diagram illustrating an example of avatar information according to a third modification of the present disclosure.

EXAMPLE EMBODIMENT

Hereinafter, example embodiments of the present disclosure will be described with reference to the drawings.

First Example Embodiment

An outline of an information processing device of the present disclosure will be described.

Figure 1:
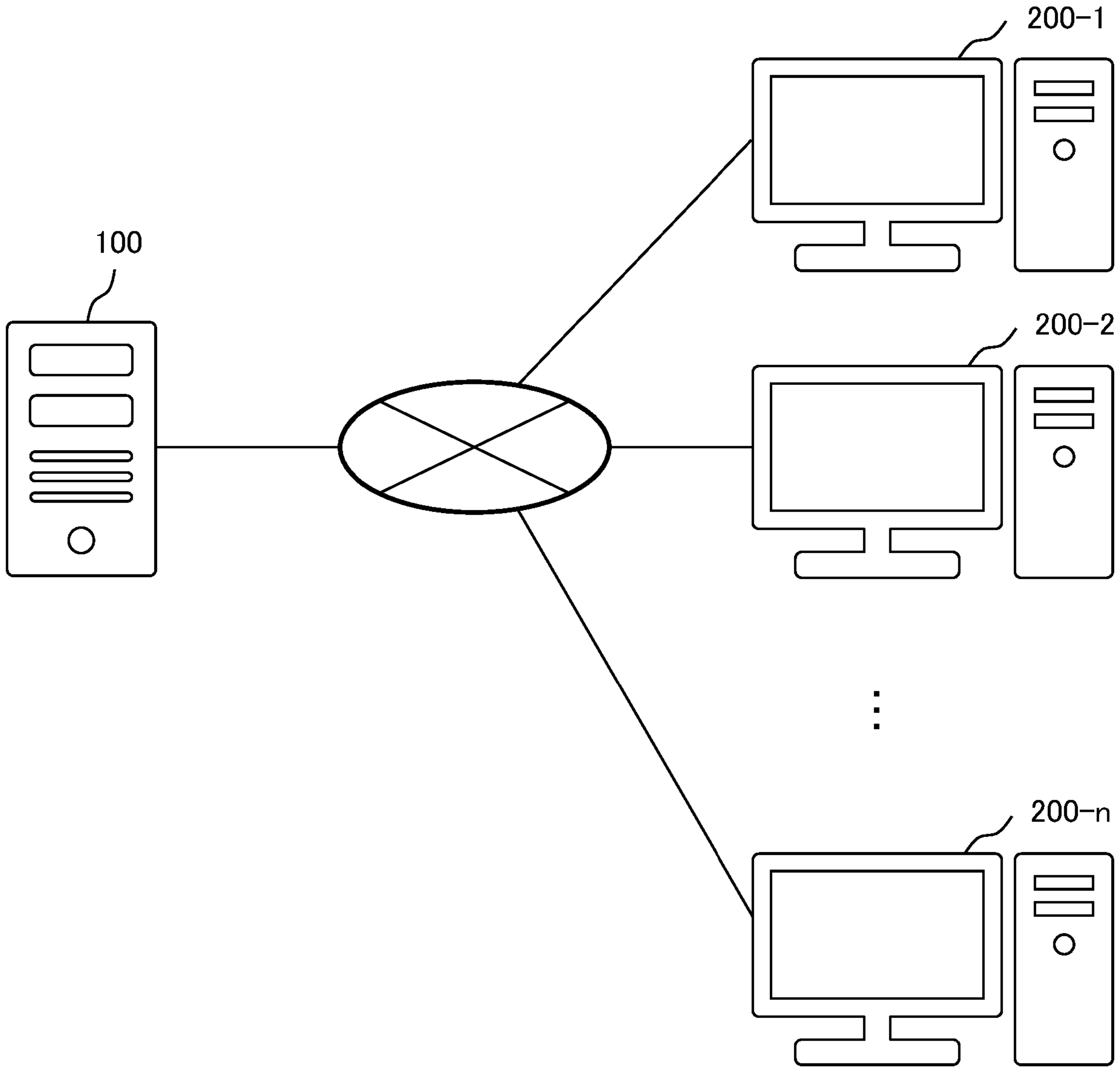
FIG. 1 is a diagram schematically illustrating an example of a configuration including an information processing device according to a first example embodiment of the present disclosure.

FIG. 1 is a diagram schematically illustrating an example of a configuration including an information processing device 100. As illustrated in FIG. 1, the information processing device 100 is communicably connected to user terminals 200-1, 200-2, . . . , and **200-*n* (n is a natural number of 1 or more) via a wireless or wired network. Here, in a case where the user terminals 200-1, 200-2, . . . , and 200-*n* are not distinguished from one another, they are simply referred to as the user terminal 200. The user terminal 200 is a device operated by a user. The user terminal 200 is, for example, a personal computer, but is not limited thereto. The user terminal 200 may be a smartphone or a tablet terminal, or may be a device including a goggle-type wearable terminal (also referred to as a head-mounted display) including a display. In addition, the user terminal 200 includes an input device such as a keyboard, a mouse, a microphone, or a wearable device that performs an operation based on a motion of the user, and an output device such as a display or a speaker. Furthermore, the user terminal 200** includes at least one of an imaging device or a device capable of reading a voiceprint, a fingerprint, a palm print, an iris, a vein, or the like.

Figure 2:
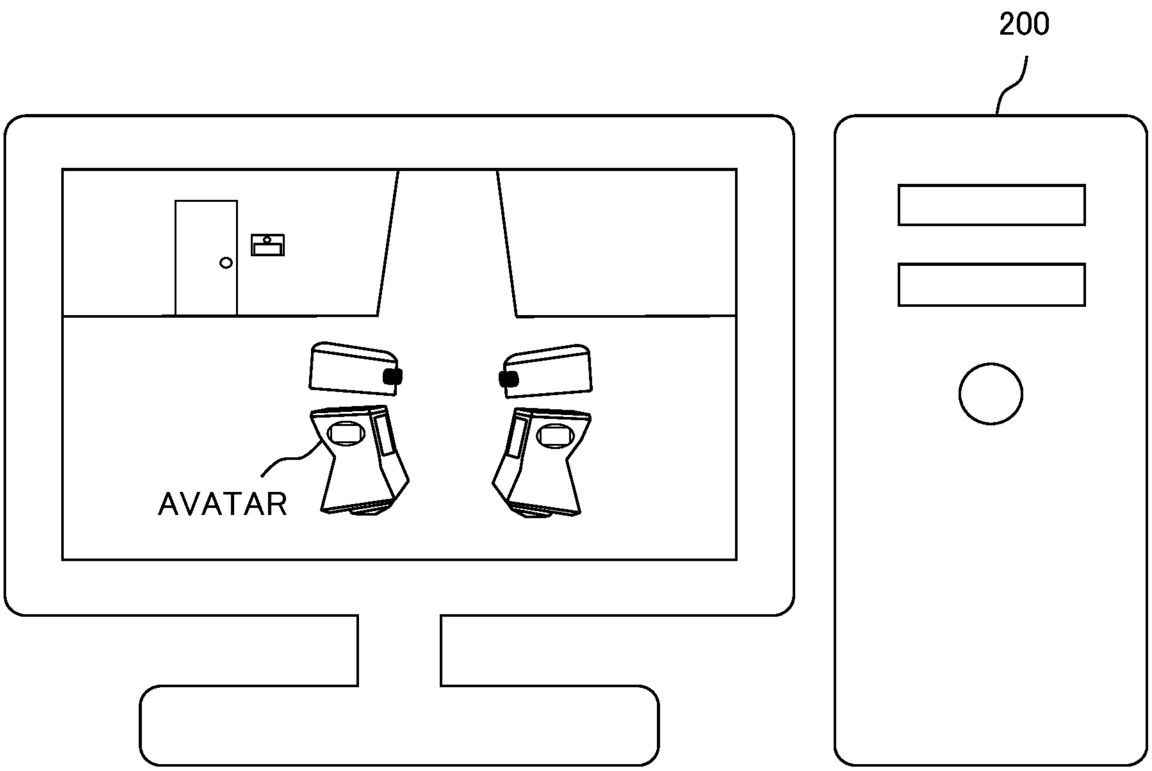
FIG. 2 is a diagram schematically illustrating an example of a virtual space displayed on a user terminal according to the first example embodiment of the present disclosure.

First, a virtual space in the present disclosure will be described. The virtual space is a virtual space shared by a plurality of users, and is a space reflecting a user operation. The virtual space is also referred to as a VR space. For example, the virtual space is provided by the information processing device 100. The user terminal 200 displays an image indicating the virtual space. FIG. 2 is a diagram schematically illustrating an example of the virtual space displayed on the user terminal 200. In the example of FIG. 2, the virtual space is displayed on the display of the user terminal 200. As illustrated in FIG. 2, the virtual space includes an avatar. The avatar is a target to be operated by the user. The user uses the virtual space by operating the avatar. For example, the user terminal 200 may display an image of the virtual space in the viewpoint of the avatar operated by the user. In this case, the image displayed on the user terminal 200 may be updated according to a motion of the avatar. Furthermore, for example, the user may be able to communicate with another user by performing an action on an avatar operated by another user. A device that provides the virtual space does not have to be the information processing device 100. For example, an external device (not illustrated) may provide the virtual space.

Figure 3:
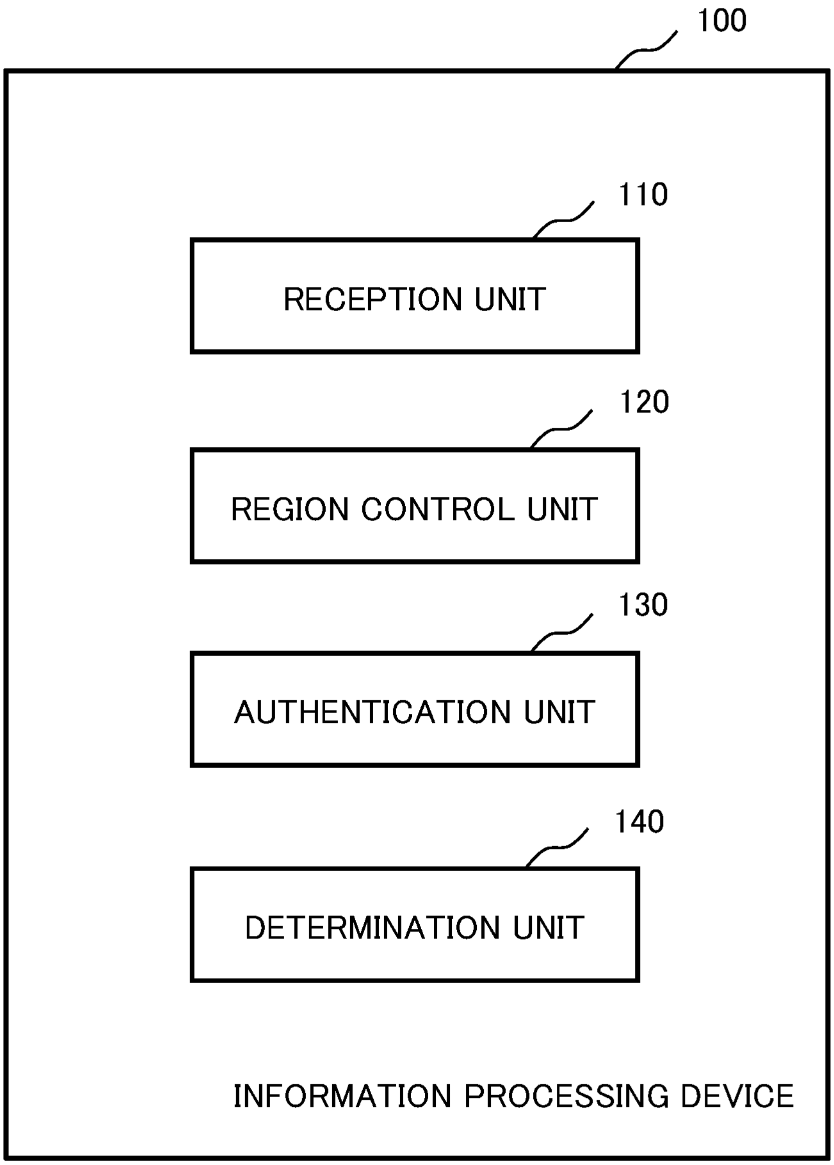
FIG. 3 is a block diagram illustrating an example of a functional configuration of the information processing device according to the first example embodiment of the present disclosure.

FIG. 3 is a block diagram illustrating an example of a functional configuration of the information processing device 100 according to the first example embodiment. As illustrated in FIG. 3, the information processing device 100 includes a reception unit 110, a region control unit 120, an authentication unit 130, and a determination unit 140.

The reception unit 110 receives various inputs. For example, the reception unit 110 acquires setting information input by a user operation from the user terminal 200. The setting information is information indicating restriction of an entry to a partial region of the virtual space. In this manner, the reception unit 110 receives an input of the setting information which is information indicating restriction of an entry to the partial region of the virtual space. The reception unit 110 is an example of reception means.

The region control unit 120 sets, as a specific region, the partial region of the virtual space indicated by the setting information. The specific region may be, for example, a region to be subjected to avatar entry/exit management. The region control unit 120 is an example of region control means.

The authentication unit 130 performs user authentication. Specifically, for example, in a case where the avatar attempts to enter the specific region, the authentication unit 130 acquires biometric information of the user who operates the avatar. At this time, for example, the authentication unit 130 may acquire a face feature amount extracted from a face image of the user imaged in the user terminal 200 as the biometric information. Then, the authentication unit 130 performs biometric authentication. For example, the authentication unit 130 compares the acquired face feature amount with a face feature amount of a user included in an authentication database. The authentication database may be included in the information processing device 100 or may be included in an external device different from the information processing device 100. For example, in a case where the face feature amounts match each other, the authentication unit 130 determines that the biometric authentication is successful. Furthermore, for example, in a case where the face feature amounts do not match each other, the authentication unit 130 determines that the biometric authentication has failed. In this example, an example of performing face authentication as the biometric authentication has been described, but authentication using a voiceprint, a fingerprint, a palm print, an iris, a vein, or the like may be performed. As described above, in a case where the avatar attempts to enter the specific region, the authentication unit 130 performs the biometric authentication of the user who operates the avatar.

The determination unit 140 determines whether to allow the avatar to enter. For example, in a case where the biometric authentication by the authentication unit 130 has failed, the determination unit 140 rejects the entry of the avatar. Furthermore, for example, in a case where the biometric authentication by the authentication unit 130 is successful, the determination unit 140 allows the entry of the avatar. For example, in a case where the biometric authentication by the authentication unit 130 is successful, the determination unit 140 may determine whether to allow the entry to the specific region based on a separately determined condition. In this manner, the determination unit 140 determines whether to allow the avatar to enter the specific region according to the result of the biometric authentication. The determination unit 140 is an example of determination means.

Next, an example of an operation of the information processing device 100 will be described with reference to FIG. 4. In the present disclosure, each step of the flowchart is expressed by using a number assigned to each step, such as "S1".

Figure 4:
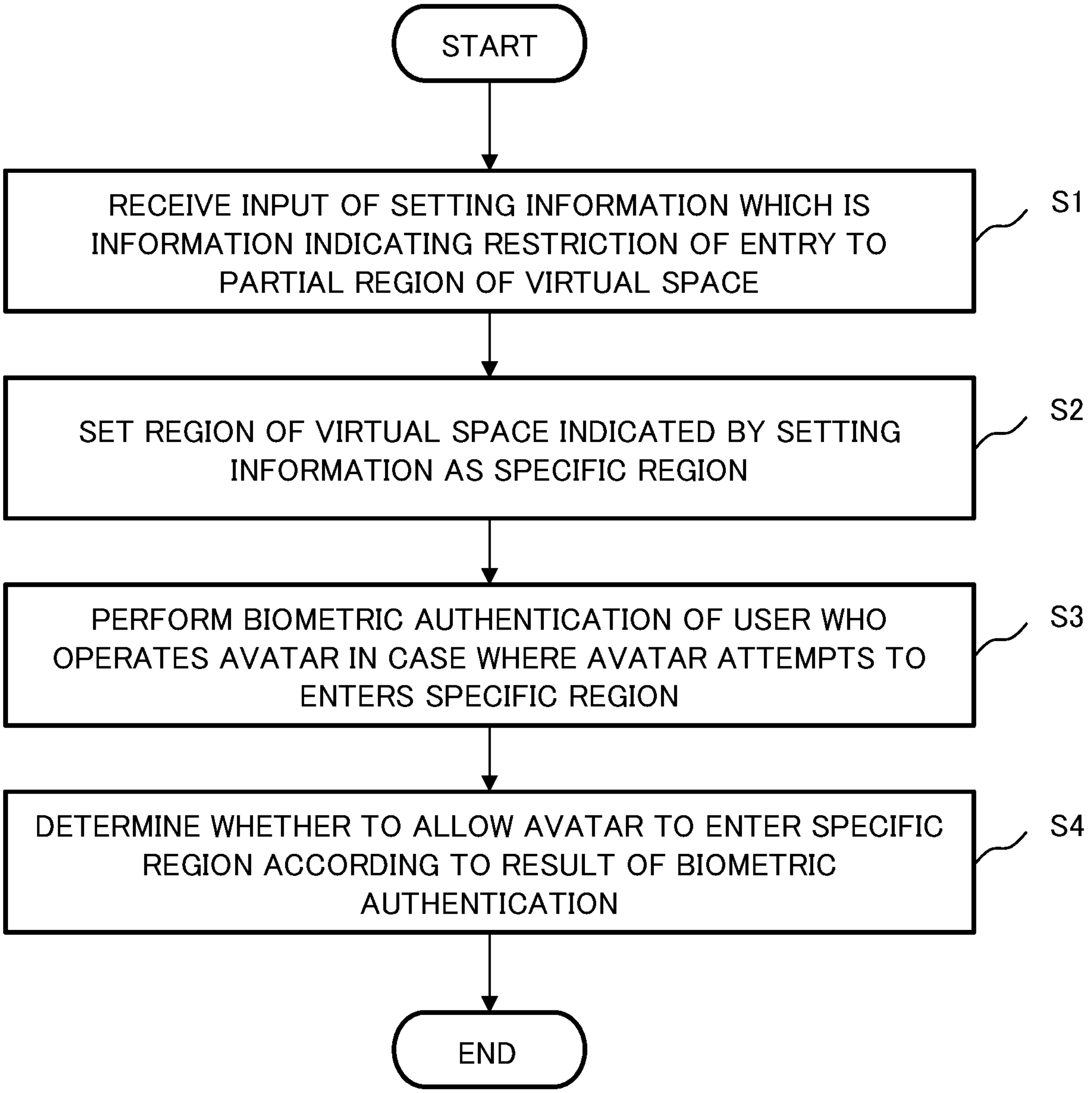
FIG. 4 is a flowchart illustrating an example of an operation of the information processing device according to the first example embodiment of the present disclosure.

FIG. 4 is a flowchart illustrating an example of the operation of the information processing device 100. The reception unit 110 receives an input of the setting information which is information indicating restriction of an entry to a partial region of the virtual space (S1). The region control unit 120 sets, as the specific region, the region of the virtual space indicated by the setting information (S2). In a case where the avatar attempts to enter the specific region, the authentication unit 130 performs the biometric authentication of the user who operates the avatar (S3). The determination unit 140 determines whether to allow the avatar to enter the specific region according to the result of the biometric authentication (S4).

As described above, the information processing device 100 according to the first example embodiment receives an input of the setting information which is information indicating restriction of an entry to a partial region of the virtual space, and sets the region of the virtual space indicated by the setting information as the specific region. Then, in a case where the avatar attempts to enter the specific region, the information processing device 100 performs the biometric authentication of the user who operates the avatar, and determines whether to allow the avatar to enter the specific region according to the result of the biometric authentication. As a result, the information processing device 100 can confirm the user who operates the avatar, and thus can perform appropriate entry/exit management for the specific region. Furthermore, the information processing device 100 can freely set the specific region to be subjected to the entry/exit management according to the input. That is, the information processing device 100 can perform appropriate entry/exit management for any region in the virtual space.

Second Example Embodiment

Next, an information processing device according to a second example embodiment will be described. In the second example embodiment, the information processing device 100 described in the first example embodiment will be described in more detail.

Figure 5:
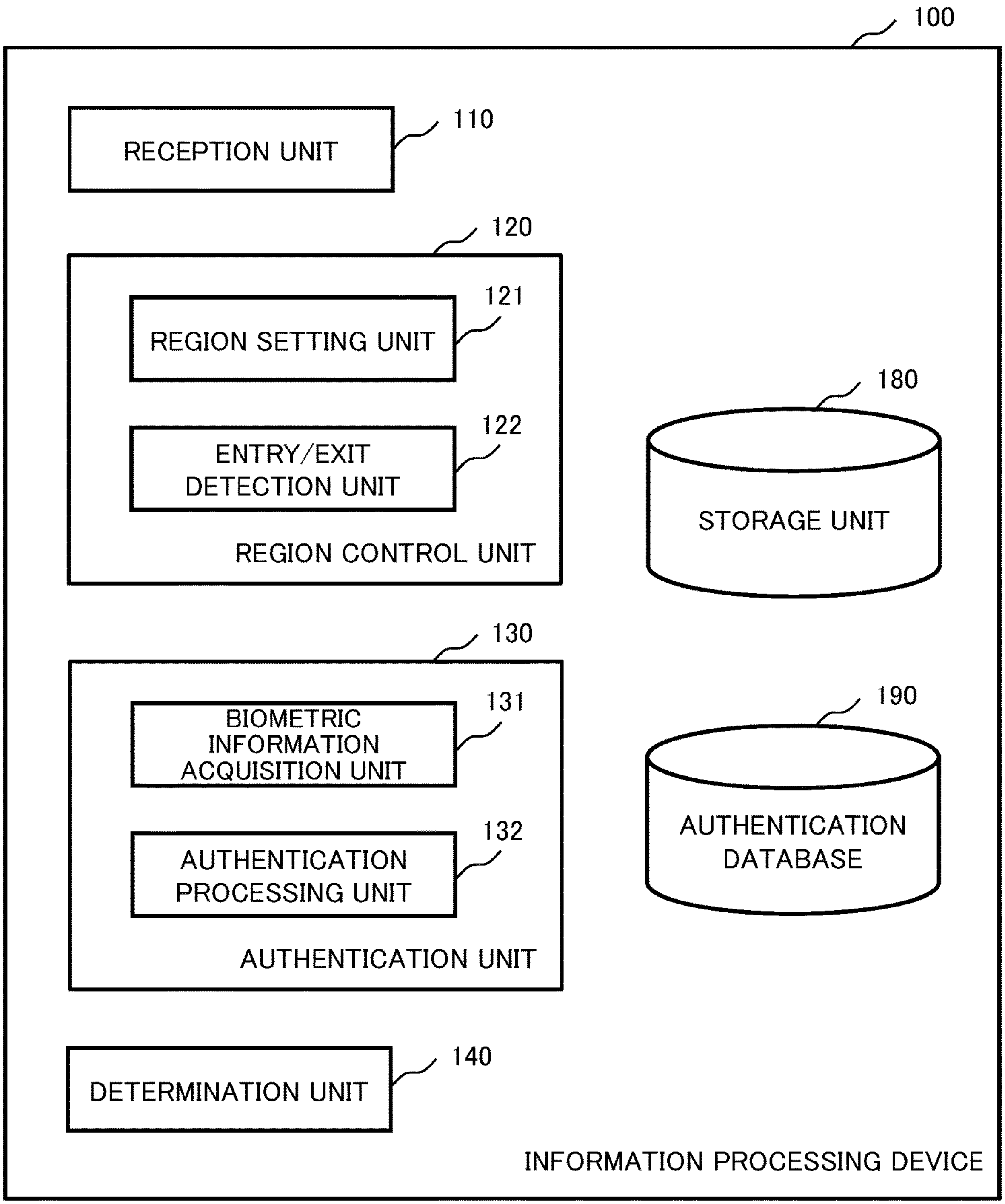
FIG. 5 is a block diagram illustrating an example of a functional configuration of an information processing device according to a second example embodiment of the present disclosure.

FIG. 5 is a block diagram illustrating an example of a functional configuration of an information processing device 100 according to the second example embodiment. As illustrated in FIG. 5, the information processing device 100 includes a reception unit 110, a region control unit 120, an authentication unit 130, and a determination unit 140. Furthermore, the information processing device 100 includes a storage unit 180 and an authentication database 190. The storage unit 180 and the authentication database 190 may be provided in another storage device capable of communicating with the information processing device 100. Hereinafter, the authentication database may be referred to as an authentication DB.

The reception unit 110 receives an input of setting information. Specifically, the setting information is input by a user in the user terminal 200. The reception unit 110 acquires the input setting information from the user terminal 200. The setting information includes, for example, information indicating a position of a region, a date and time, a condition, and the like. Details of each piece of information will be described later.

The region control unit 120 includes a region setting unit 121 and an entry/exit detection unit 122. The region setting unit 121 sets a specific region in a virtual space based on the setting information. The specific region is a region for which user usage is restricted. That is, an avatar operated by a user who is not allowed to use the specific region cannot enter the specific region.

Then, the region setting unit 121 updates specific region information. The specific region information is information regarding the specific region set in the virtual space. The specific region information is stored in the storage unit 180. FIG. 6 is a diagram illustrating an example of the specific region information. The specific region information is associated with region identification information for identifying the region and information indicating a position of the region, a date and time, and a condition indicated by the setting information. In the example of FIG. 6, information regarding a specific region whose region identification information is "001" and a specific region whose region identification information is "002" is included. Hereinafter, the specific region whose region identification information is "001" is also referred to as a "specific region 001", and the specific region whose region identification information is "002" is also referred to as a "specific region 002".

The information indicating the position of the region included in the specific region information indicates a position in the virtual space input by the user. The information indicating the position of the region may be coordinates. In the example of FIG. 6, the specific region 001 is indicated by coordinates. The specific region 001 indicates a rectangular region having coordinates (x1,y1) and (x2,y2) at diagonal vertices in the virtual space. Furthermore, the information indicating the position of the region may include information indicating one coordinate and a predetermined distance. In this case, the region indicates a circular range within the predetermined distance from the one coordinate. The information indicating the position of the region is not limited to this example, and the information indicating the position of the region may be indicated by a name determined for the region. For example, in a case where there is a region determined in advance as "Conference Room 1" in the virtual space, information "Conference Room 1" may be used as the information indicating the position of the region. The information indicating the date and time indicates a period set as the specific region. The example of FIG. 6 indicates that the specific region 002 is set in a period of "14:00 to 16:30 on July 20". In other words, in this case, in a case where there is an avatar that attempts to enter the position of "Conference Room 1" at "14:00 to 16:30 on July 20", authentication is performed for the user who operates the avatar. The information indicating the condition is information indicating a condition for an avatar that is allowed to enter the specific region, that is, a condition for a user who is allowed to use the specific region. The information indicating the condition may include information indicating an attribute of the user. The attribute of the user may be personal information of the user including at least one of the age, gender, affiliation, or position of the user. Further, the attribute of the user may include a rank of the user or the like determined according to a charge for a system. In the example of FIG. 6, a condition of "managerial level or above" is set for the specific region 001. That is, the condition indicates that only a user at a managerial level or above is allowed to enter the specific region 001. Furthermore, the information indicating the condition may be information indicating a user. In the example of FIG. 6, a condition of "user B, user C, and user D" is set for the specific region 002. That is, the condition indicates that only the user B, the user C, and the user D are allowed to enter the specific region 002. Further, the specific region information may include information indicating a setting user. The setting user is a user who has set the specific region, that is, a user who has input the setting information. In the example of FIG. 6, the specific region 001 is set by the user A.

In this manner, the region setting unit 121 can set a region that can be used only by a specific user in the virtual space based on the setting information input by the user. That is, it can be said that the information processing device 100 determines a value of any region in the virtual space.

As described above, the setting information acquired by the reception unit 110 includes not only the position of the region where the user desires to set entry restriction, but also the date and time set as the region and the information indicating a user who is allowed to use the region. In other words, the reception unit 110 receives, from the user terminal 200, an input of the position of the specific region, the date and time set as the specific region, and the information indicating a user who is allowed to use the specific region.

The entry/exit detection unit 122 detects an entry/exit of the avatar. For example, in a case where the user performs an operation to move the avatar and the avatar enters the specific region, the entry/exit detection unit 122 may detect that the avatar has entered the specific region. Furthermore, the entry/exit detection unit 122 may detect that the avatar is likely to enter the specific region. For example, there may be a door at an entrance of the specific region, and the entry/exit detection unit 122 may detect that the avatar has made a motion of opening the door by a user operation. For example, it is assumed that there is a door at the entrance of the specific region, and an imaging device for face authentication for unlocking the door is virtually installed near the door. In this case, in a case where the user performs an operation in such a way that the avatar looks into the imaging device, the entry/exit detection unit 122 may detect that the avatar is likely to enter the specific region. Furthermore, the entry/exit detection unit 122 may detect that the avatar has entered the specific region in a case where the avatar is forcibly moved to the specific region by an operation of another user. In this manner, the entry/exit detection unit 122 may detect an operation of causing the avatar to enter the specific region.

The authentication unit 130 includes a biometric information acquisition unit 131 and an authentication processing unit 132. The biometric information acquisition unit 131 acquires biometric information of the user. Specifically, in a case where the entry/exit detection unit 122 detects that the avatar attempts to enter the specific region, the biometric information acquisition unit 131 acquires the biometric information from the user terminal 200 of the user who operates the avatar. For example, it is assumed that an imaging device is installed in the user terminal 200. At this time, the biometric information acquisition unit 131 controls the user terminal 200 of the user who operates the avatar that attempts to enter the specific region to perform imaging. The user terminal 200 images the face of the user by using the imaging device. At this time, the biometric information acquisition unit 131 may display prompts to encourage the user to position the face for imaging. The biometric information acquisition unit 131 acquires a face image including the face of the user face from the user terminal 200, and extracts a face feature amount from the face image. That is, the biometric information acquisition unit 131 acquires the face feature amount of the user as the biometric information of the user. At this time, the user terminal 200 may extract the face feature amount from the face image. Then, the biometric information acquisition unit 131 may acquire the face feature amount transmitted from the user terminal 200. An example of the biometric information is not limited to the face feature amount. An example of using different biometric information will be described later.

The authentication processing unit 132 performs biometric authentication based on the biometric information acquired by the biometric information acquisition unit 131. Specifically, the authentication processing unit 132 compares the acquired biometric information with biometric information included in the authentication database 190. The authentication database 190 is a database including pieces of biometric information of a plurality of users. The authentication database 190 may include information in which the biometric information, the attribute of the user, and the rank of the user are associated for each user. For example, the authentication processing unit 132 may execute processing of searching the authentication database 190 for biometric information that matches the biometric information acquired by the biometric information acquisition unit 131. The comparison method is not limited to this example. Other comparison methods will be described later.

In a case where the pieces of biometric information match each other, the authentication processing unit 132 determines that the biometric authentication is successful. In a case where the pieces of biometric information do not match each other, it is determined that the biometric authentication has failed.

The determination unit 140 determines whether to allow the avatar to enter the specific region, that is, whether to allow the user to use the specific region. For example, the determination unit 140 rejects the entry of the avatar operated by the user who has failed in the biometric authentication. In addition, the determination unit 140 determines whether the user who has succeeded in the biometric authentication satisfies the condition determined in the specific region information. For example, it is assumed that a predetermined avatar has entered the specific region 001 illustrated in FIG. 6. At this time, it is assumed that the user who operates the predetermined avatar is a section head whose position is below a department head. Then, in a case where the biometric authentication of the user by the authentication processing unit 132 is successful, the determination unit 140 determines whether the user is a user who satisfies the condition. In this case, since the user does not satisfy the condition, the determination unit 140 rejects the entry of the avatar operated by the user. The determination unit 140 can acquire information regarding the position of the user from the authentication database 190. Furthermore, for example, it is assumed that a predetermined avatar enters the specific region 002 illustrated in FIG. 6. Here, it is assumed that the user who operates the predetermined avatar is "user C". In a case where the biometric authentication of the user C by the authentication processing unit 132 is successful, the determination unit 140 determines whether the user C is a user who satisfies the condition. In this case, since the user satisfies the condition, the determination unit 140 allows the entry of the avatar operated by the user. The present disclosure is not limited thereto, and, for example, in a case where the condition determined in the specific region information includes information indicating a predetermined group, the determination unit 140 determines whether the user belongs to the predetermined group.

[Example of Operation of Information Processing Device 100]

Figure 7:
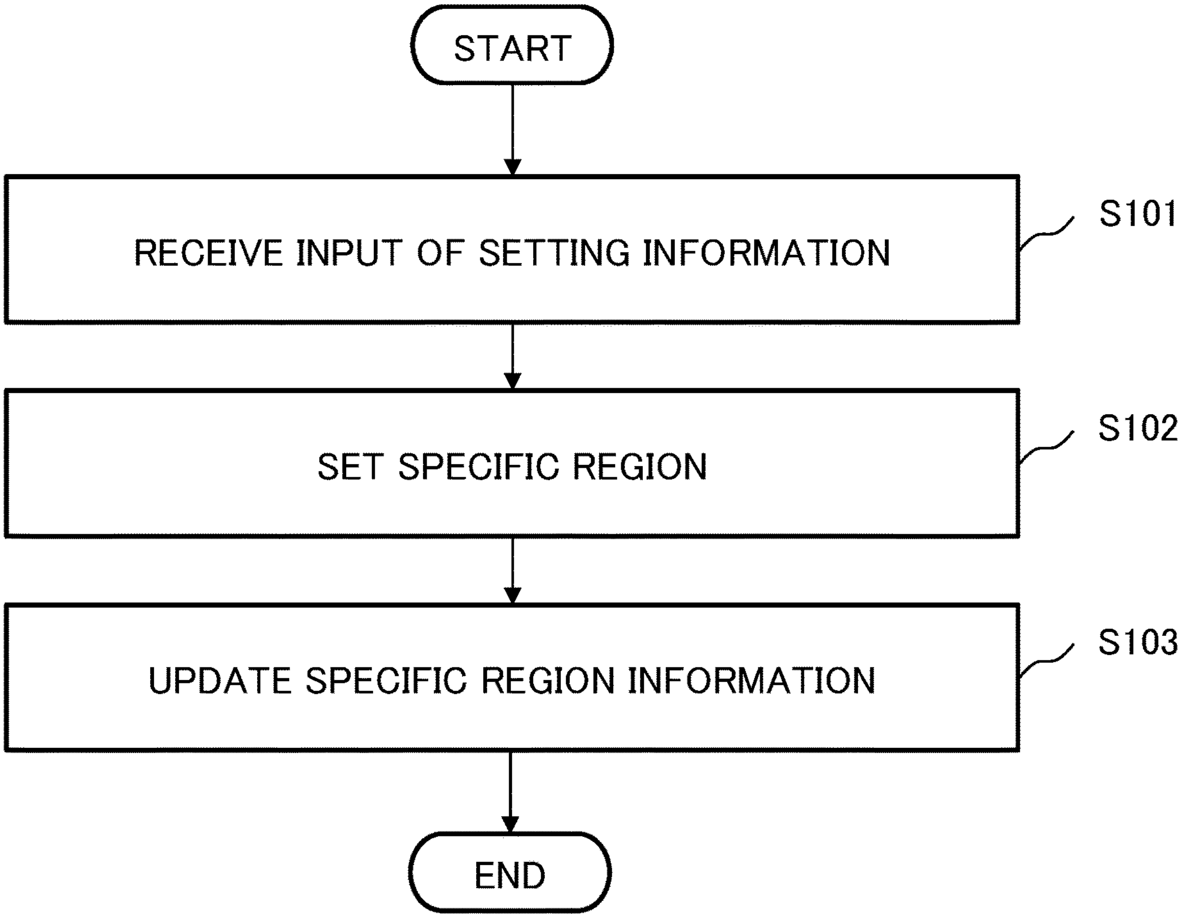
FIG. 7 is a flowchart illustrating an example of an operation of the information processing device according to the second example embodiment of the present disclosure.

Next, an example of an operation of the information processing device 100 according to the second example embodiment will be described with reference to FIG. 7. FIG. 7 is a flowchart illustrating an example of the operation of the information processing device 100. Specifically, FIG. 7 illustrates an example of an operation when the information processing device 100 sets the specific region.

First, the reception unit 110 receives an input of the setting information (S101). The region setting unit 121 sets the specific region based on the setting information (S102). Specifically, the region setting unit 121 sets the specific region based on the information indicating the position of the region, the information indicating the date and time, and the information indicating the condition included in the setting information. Then, the region setting unit 121 updates the specific region information.

Figure 8:
FIG. 8 is a flowchart illustrating another example of the operation of the information processing device according to the second example embodiment of the present disclosure.

Next, another example of the operation of the information processing device 100 will be described with reference to FIG. 8. FIG. 8 is a flowchart illustrating another example of the operation of the information processing device 100. Specifically, FIG. 8 illustrates an example of an operation in which the information processing device 100 determines whether to allow the avatar to enter the specific region. In this example, an example in which the face feature amount is used as the biometric information used for authentication will be described.

The entry/exit detection unit 122 detects an avatar that attempts to enter the specific region. For example, the entry/exit detection unit 122 detects an operation of causing the avatar to enter the specific region. In a case where there is no avatar that attempts to enter the specific region ("No" in S201), the information processing device 100 ends the processing. In a case where there is an avatar that attempts to enter the specific region ("Yes" in S201), the biometric information acquisition unit 131 causes the user terminal 200 to image the user who operates the avatar (S202). At this time, the face image of the user is captured in the user terminal 200. Then, the biometric information acquisition unit 131 acquires the face feature amount from the face image as the biometric information (S203). The authentication processing unit 132 performs face authentication based on the acquired face feature amount and the face feature amount included in the authentication DB 190 (S204).

In a case where the user has been authenticated by the face authentication ("Yes" in S205), the determination unit 140 determines whether the user satisfies the condition. In a case where the user satisfies the condition ("Yes" in S206), the determination unit 140 allows the entry of the avatar operated by the user (S207). In a case where the user has not been authenticated by the face authentication ("No" in S205) and the user does not satisfy the condition ("No" in S206), the determination unit 140 rejects the entry of the avatar operated by the user (S208).

As described above, the information processing device 100 according to the second example embodiment receives an input of the setting information which is information indicating restriction of an entry to a partial region of the virtual space, and sets the partial region of the virtual space indicated by the setting information as the specific region. Then, in a case where the avatar attempts to enter the specific region, the information processing device 100 performs the biometric authentication of the user who operates the avatar, and determines whether to allow the avatar to enter the specific region according to the result of the biometric authentication. As a result, the information processing device 100 according to the second example embodiment has effects similar to the effects described in the first example embodiment. That is, the information processing device 100 can perform appropriate entry/exit management for any region in the virtual space.

Furthermore, in the second example embodiment, the setting information includes information indicating a user who is allowed to use a partial region indicated by the setting information, and the information processing device 100 may set a condition for the user who is allowed to use the specific region based on the setting information. Then, in a case where the user who operates the avatar that attempts to enter the specific region is a user who satisfies the condition, the information processing device 100 may allow the avatar operated by the specified user to enter the specific region. In this manner, the information processing device 100 can set a detailed use condition for each specific region and perform the avatar entry/exit management according to the detailed use condition.

First Modification

The biometric authentication may be performed at any given time. That is, the information processing device 100 may perform the biometric authentication of the user who operates the avatar allowed to enter the specific region at any given time.

For example, it is assumed that the avatar allowed to enter the specific region is present in the specific region. In this case, the entry/exit detection unit 122 requests the authentication unit 130 to perform the biometric authentication of the user who operates the avatar present in the specific region at a predetermined timing. The predetermined timing may be a predetermined time point, a timing at which a predetermined time has elapsed from the entry of the avatar, or a random timing.

In a case where the entry/exit detection unit 122 requests the biometric authentication, the biometric information acquisition unit 131 acquires the biometric information of the user who operates the target avatar. The authentication processing unit 132 performs the biometric authentication of the user by using the acquired biometric information.

The determination unit 140 determines whether to allow the avatar to enter the specific region in response to the biometric authentication. In particular, in this case, the determination unit 140 determines whether the avatar is present in the specific region. For example, in a case where the biometric authentication has failed, the determination unit 140 determines that the avatar should not be present in the specific region. Furthermore, in a case where the biometric authentication has succeeded and the user is a user who does not satisfy the condition for using the specific region, the determination unit 140 determines that the avatar should not be present in the specific region. Furthermore, in a case where the biometric authentication has succeeded and the user is a user who satisfies the condition for using the specific region, the determination unit 140 determines that the avatar may be present in the specific region.

As described above, the information processing device 100 according to the first modification performs the biometric authentication of the user who operates the avatar present in the specific region at any given time, and determines whether to allow the avatar to enter the specific region in response to the biometric authentication. There is a possibility that the user who operates the avatar may be replaced with another user after the entry to the specific region is allowed. That is, there is a possibility that another user impersonates a user who is allowed to use the specific region. With the above configuration, the information processing device 100 according to the first modification can detect such impersonation.

It is assumed that there is a room in which only a specific person is allowed to enter under an actual environment. In a case of performing face authentication for a person in the room, it is necessary to move the imaging device together with the person or to install a plurality of imaging devices to track the person. However, the biometric authentication can be performed at any given timing in the virtual space as in the present disclosure.

Second Modification

In the second example embodiment, an example in which the information processing device 100 performs the biometric authentication by using the face feature amount has been described. In this case, the user can undergo the authentication only by allowing capturing of the face image. That is, the information processing device 100 can suppress a burden on the user at the time of authentication.

However, this does not exclude performing the biometric authentication by using the biometric information other than the face feature amount. That is, the information processing device 100 may perform the biometric authentication by using the biometric information other than the face feature amount. For example, the biometric information acquisition unit 131 may acquire a feature amount indicating a voiceprint, a fingerprint, a palm print, an iris, a vein, or the like as the biometric information. In this case, the user terminal 200 includes a device capable of reading a voiceprint, a fingerprint, a palm print, an iris, a vein, or the like. The biometric information acquisition unit 131 acquires the biometric information read by the device.

Then, the authentication processing unit 132 performs the biometric authentication by using the authentication database 190. In this case, the authentication database 190 includes information associated with the biometric information such as a voiceprint, a fingerprint, a palm print, an iris, or a vein for each user.

Third Modification

In the second example embodiment, an example has been described in which the information processing device 100 compares the biometric information acquired from the user terminal 200 with the pieces of biometric information of a plurality of users included in the authentication database 190. The comparison method is not limited to this example.

FIG. 9 is a diagram illustrating an example of avatar information. The avatar information is information in which at least avatar identification information for identifying the avatar and information indicating the user who operates the avatar are associated with each other. In the example of FIG. 9, information indicating the attribute of the user who operates the avatar is further associated. The avatar information may be stored in the storage unit 180.

The authentication processing unit 132 specifies the avatar information of an avatar that attempts to enter the specific region, that is, an avatar operated by a user who is a target for the biometric authentication. For example, it is assumed that the avatar identification information of the avatar that attempts to enter the specific region is "ABC". In this case, the authentication processing unit 132 specifies that the user who operates the avatar whose avatar identification information is "ABC" is the "user A". Next, the authentication processing unit 132 reads the biometric information of the user A from the authentication database 190. Then, the authentication processing unit 132 compares the read biometric information with the biometric information acquired by the biometric information acquisition unit 131. In a case where the pieces of biometric information do not match each other, the authentication processing unit 132 determines that the biometric authentication has failed. In a case where the pieces of biometric information match each other, the authentication processing unit 132 determines that the biometric authentication is successful.

Fourth Modification

In the second example embodiment, an example has been described in which the information processing device 100 determines whether the user is a user who satisfies the condition after performing the biometric authentication. The present disclosure is not limited thereto, and the information processing device 100 may perform the determination using the condition before performing the biometric authentication.

Figure 10:
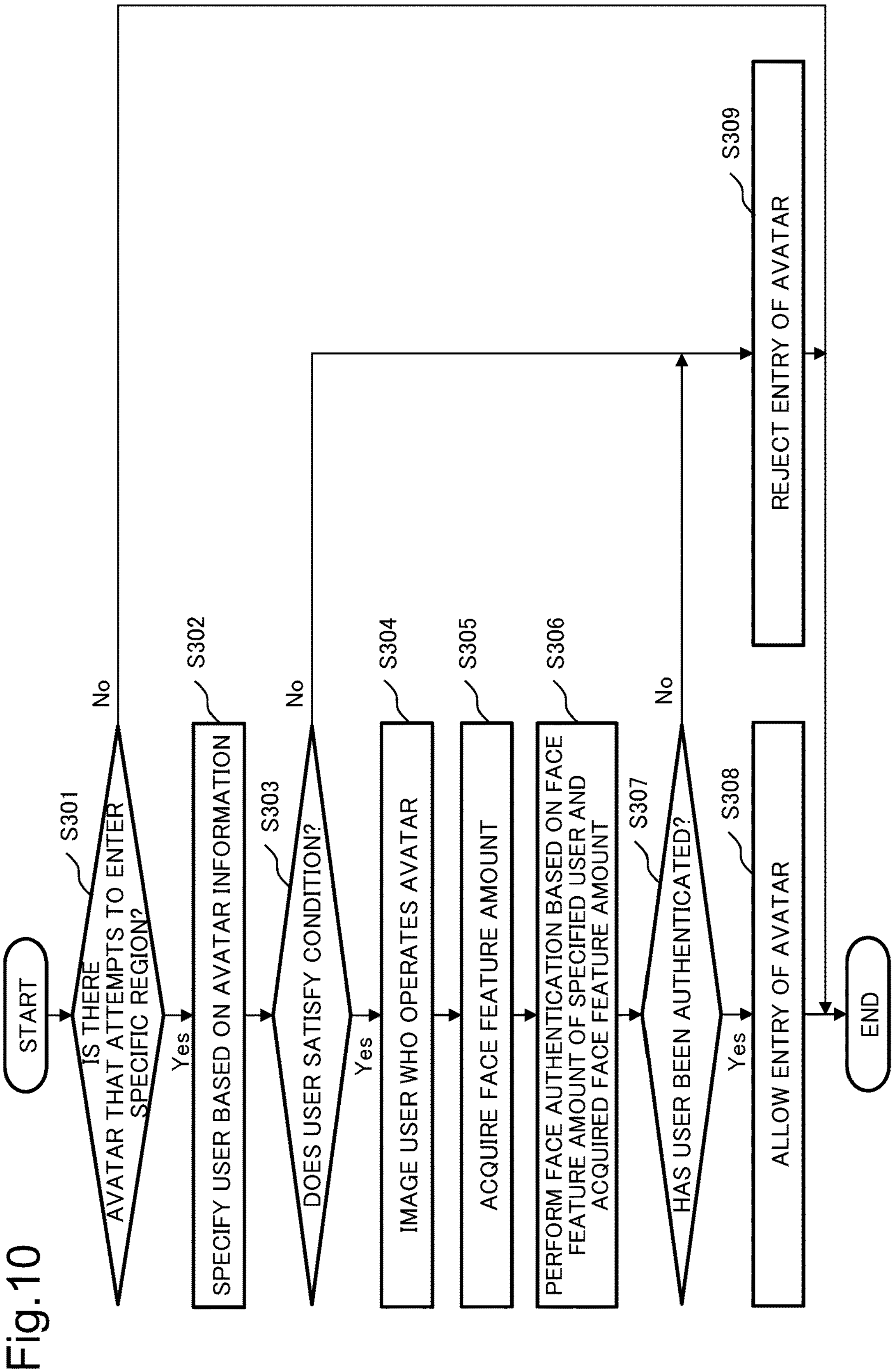
FIG. 10 is a flowchart illustrating an example of an operation of the information processing device according to a fourth modification of the present disclosure.

FIG. 10 is a flowchart illustrating an example of an operation of the information processing device 100 according to a fourth modification. In this operation example, it is assumed that the specific region information illustrated in FIG. 6 and the avatar information illustrated in FIG. 9 are stored in the storage unit 180.

The entry/exit detection unit 122 detects an avatar that attempts to enter the specific region. In a case where there is no avatar that attempts to enter the specific region ("No" in S301), the information processing device 100 ends the processing. In a case where there is an avatar that attempts to enter the specific region ("Yes" in S301), the determination unit 140 specifies the user based on the avatar information (S302). Specifically, the determination unit 140 acquires the avatar identification information of the avatar that attempts to enter the specific region. Then, the determination unit 140 specifies the user who operates the avatar based on the avatar information. For example, in a case where the avatar identification information of the avatar that attempts to enter the specific region is "DEF", the determination unit 140 specifies the user B.

Next, the determination unit 140 determines whether the specified user is a user who is allowed to use the specific region. For example, it is assumed that the avatar attempts to enter the specific region 002. The condition of "user B, user C, and user D" is set for the specific region 002. Therefore, in a case where the specified user is the user B, the determination unit 140 determines that the user B is a user who satisfies the condition set for the specific region 002. As described above, in a case where the specified user is a user who satisfies the condition ("Yes" in S303), the authentication unit 130 performs the biometric authentication. In a case where the specified user is not a user who satisfies the condition ("No" in S303), the determination unit 140 rejects the entry of the avatar (S309).

The biometric information acquisition unit 131 causes the user terminal 200 to image the user who operates the avatar (S305). Then, the biometric information acquisition unit 131 acquires the face feature amount (S306). The authentication processing unit 132 reads the face feature amount of the user specified by the determination unit 140 from the authentication database 190. Then, the authentication processing unit 132 performs the face authentication based on the specified face feature amount of the user and the biometric information acquired by the biometric information acquisition unit 131 (S306). In a case where the user has been authenticated ("Yes" in S307), the determination unit 140 allows the entry of the avatar (S308). In a case where the user has not been authenticated ("No" in S307), the determination unit 140 rejects the entry of the avatar (S309).

With such a configuration, the information processing device 100 according to the fourth modification does not necessarily perform the biometric authentication when determining whether to allow an entry to the specific region. As a result, the information processing device 100 can reduce a communication amount and reduce a processing load.

Fifth Modification

Figure 11:
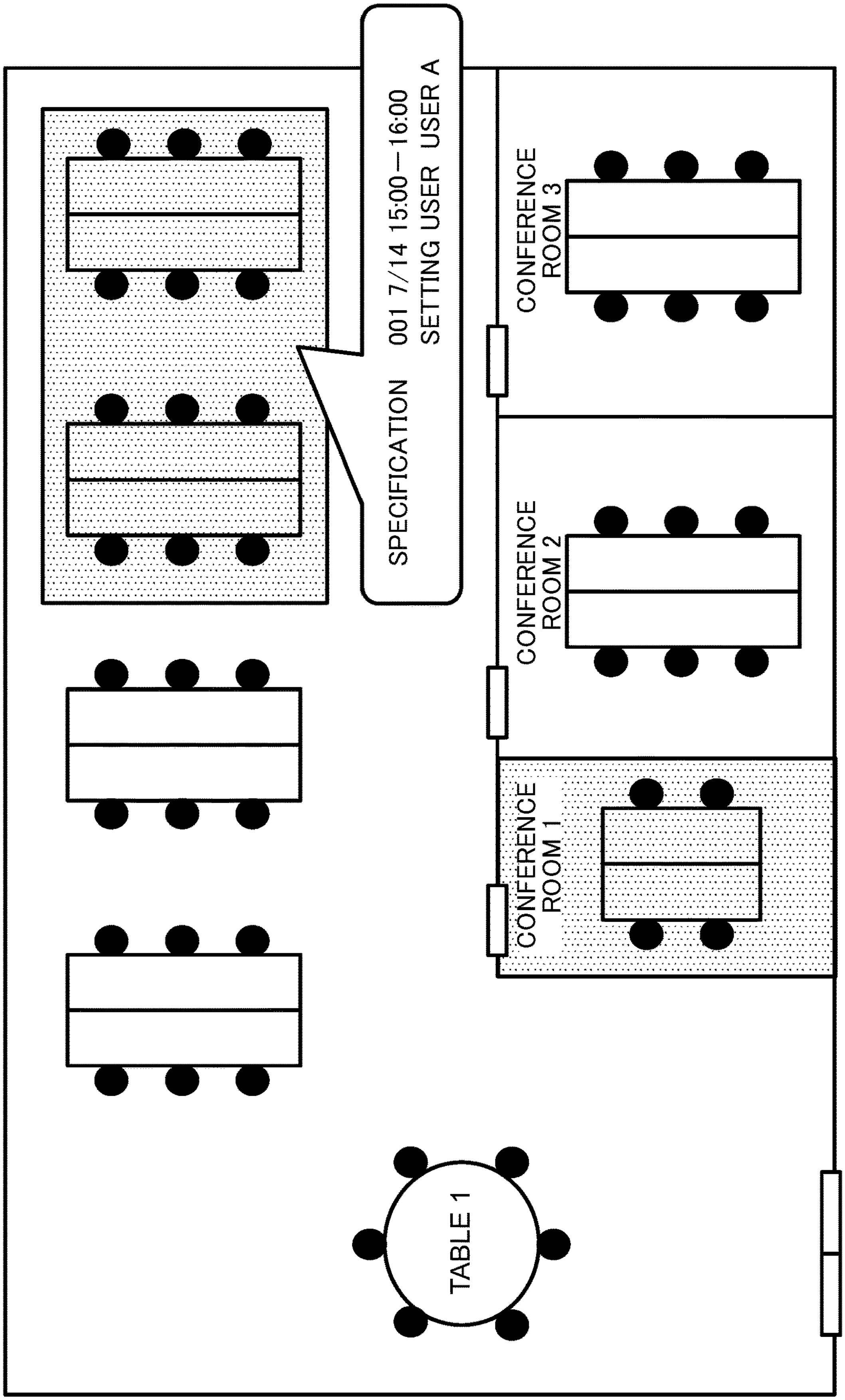
FIG. 11 is a diagram illustrating an example of a map according to a fifth modification of the present disclosure.

The region setting unit 121 of the region control unit 120 may control a map indicating the virtual space. For example, the region setting unit 121 displays the map indicating the virtual space on the user terminal 200. FIG. 11 is a diagram illustrating an example of the map. As illustrated in FIG. 11, the map includes a table, a room, and the like arranged in the virtual space. A name associated to a predetermined region such as "Table 1" or "Conference Room 1" may be superimposed on the map.

Furthermore, the region setting unit 121 may superimpose information indicating the specific region on the map. In the example of FIG. 11, a portion of the map that is associated to the specific region is hatched. The present disclosure is not limited thereto, and the region setting unit 121 may color a portion of the map that is associated to the specific region with a predetermined color. Furthermore, the region setting unit 121 may display details of the specific region according to a user operation. For example, in a case where the user selects a portion of the specific region of the map by clicking or the like, the region setting unit 121 displays details of the selected specific region. In the example of FIG. 11, the date and time, the setting user, and the like of the specific region 001 are displayed.

Figure 12:
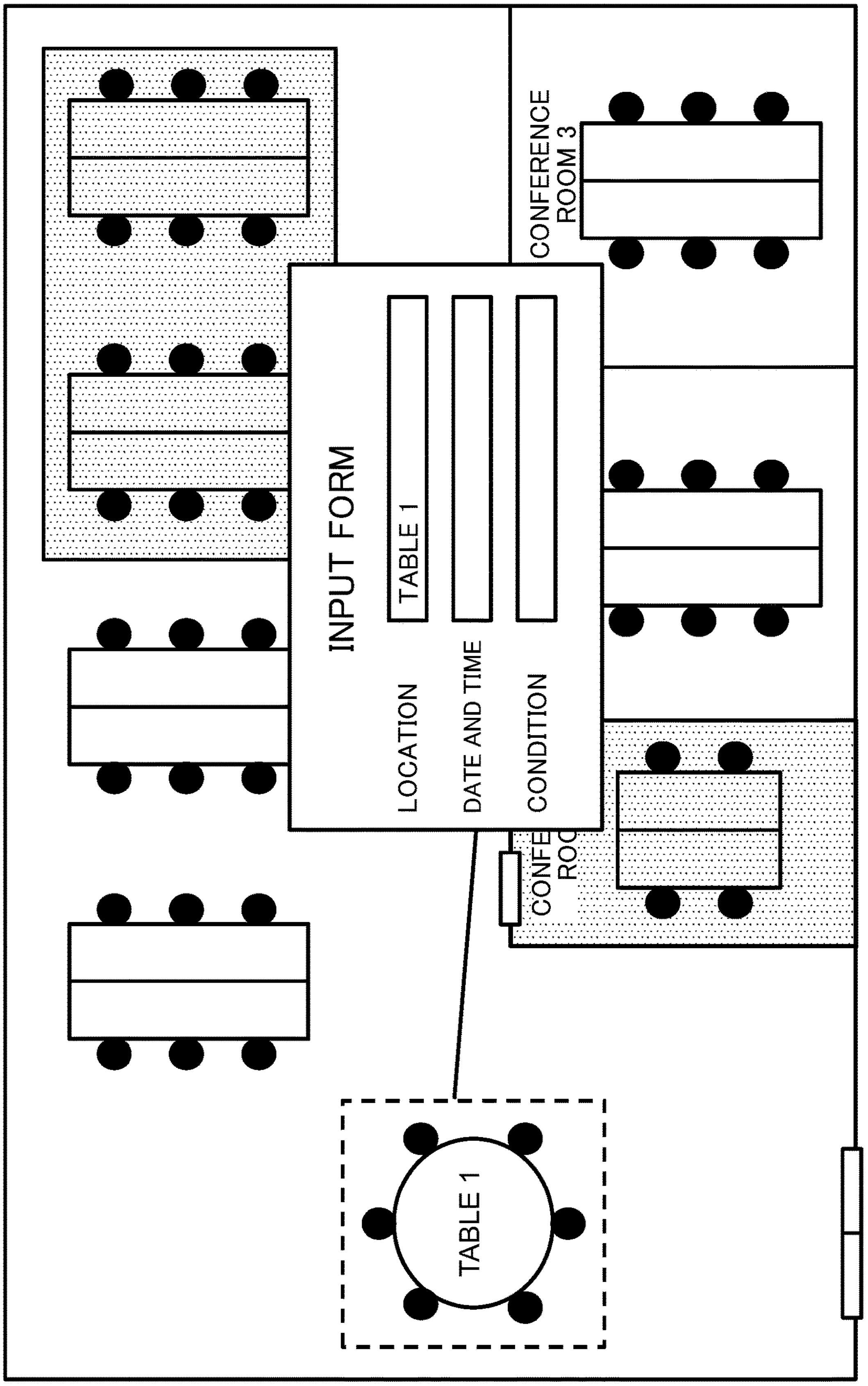
FIG. 12 is a view illustrating an example of an input form according to the fifth modification of the present disclosure.

In addition, the reception unit 110 may receive an input of the setting information by using the map as described above. For example, it is assumed that the region setting unit 121 displays the map on the user terminal 200. At this time, it is assumed that the user selects a predetermined region of the map. At this time, the region setting unit 121 displays an input form. FIG. 12 is a diagram illustrating an example of the input form. The example of FIG. 12 illustrates a case where the user selects a region indicating "Table 1". Furthermore, in the example of FIG. 12, the region setting unit 121 displays the input form indicating a location, a date and time, and a condition in a superimposed manner on the map. The reception unit 110 receives an input to the input form as the input of the setting information.

Third Example Embodiment

Next, an information processing device according to a third example embodiment will be described. In the third example embodiment, processing for an avatar whose entry to a specific region has been rejected will be mainly described. A part of the description overlapping with the first example embodiment and the second example embodiment will be omitted.

Figure 13:
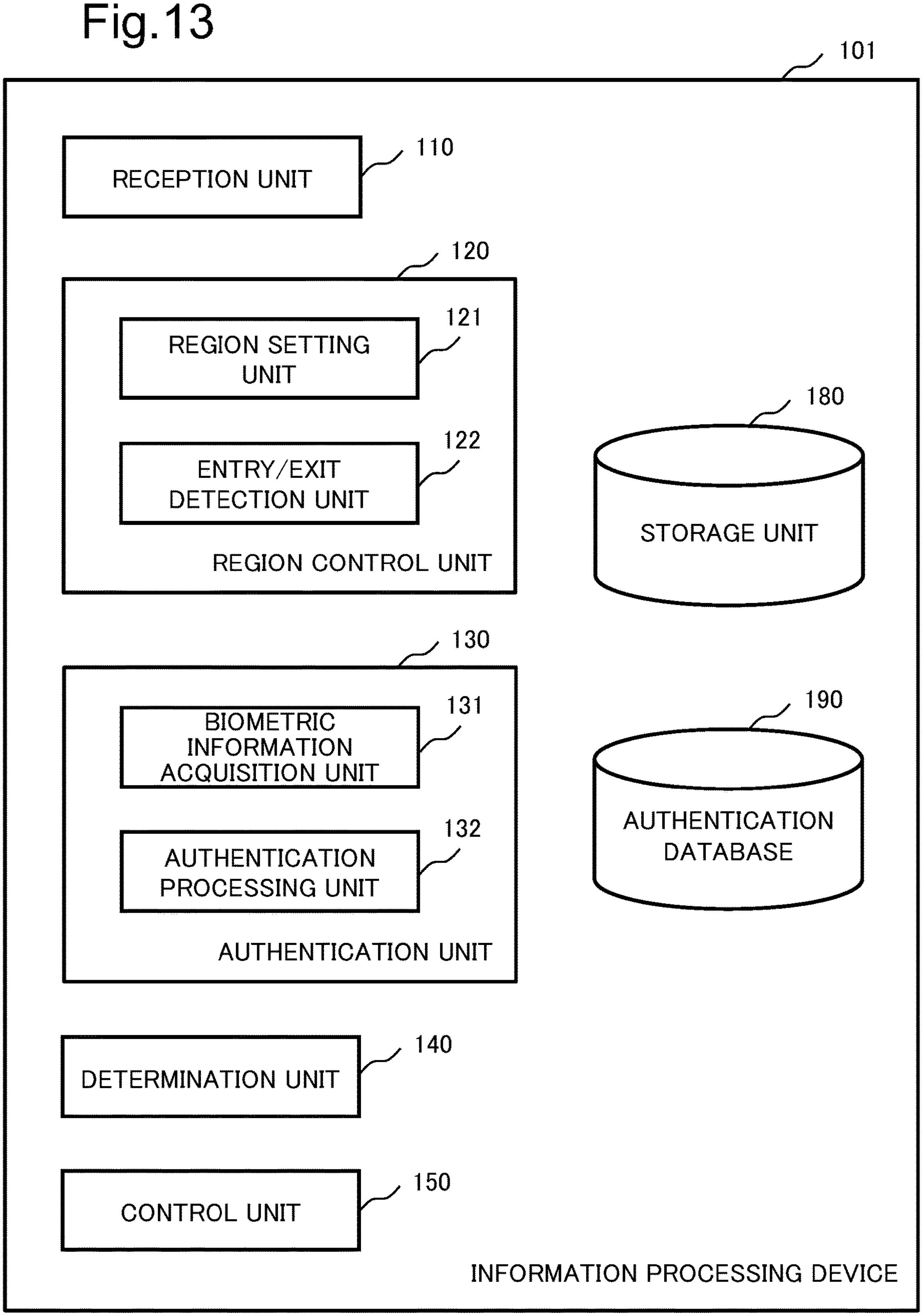
FIG. 13 is a block diagram illustrating an example of a functional configuration of an information processing device according to a third example embodiment of the present disclosure.

FIG. 13 is a block diagram illustrating an example of a functional configuration of an information processing device 101 according to the third example embodiment. The information processing device 101 is a device in which an additional configuration is added to the information processing devices 100 according to the first example embodiment and the second example embodiment. Similarly to the information processing device 100, the information processing device 101 is communicably connected to a plurality of user terminals 200 via a wireless or wired network.

As illustrated in FIG. 13, the information processing device 101 includes a reception unit 110, a region control unit 120, an authentication unit 130, a determination unit 140, and a control unit 150. Furthermore, the information processing device 101 includes a storage unit 180 and an authentication database 190. The storage unit 180 and the authentication database 190 may be provided in an external storage device or the like that can communicate with the information processing device 101.

The control unit 150 controls an avatar. For example, the determination unit 140 moves the avatar whose entry to a specific region has been rejected to a location different from the specific region. Hereinafter, the avatar whose entry to the specific region has been rejected is referred to as a rejected avatar. Furthermore, an avatar that is allowed to enter the specific region is referred to as an allowed avatar. The rejected avatar may be an avatar who has attempted to enter the specific region and an avatar whose entry has been rejected by the determination unit 140. Furthermore, the rejected avatar may be an avatar that is already present in the specific region and an avatar whose entry has been rejected when the determination is made again by the determination unit 140.

The control unit 150 moves the rejected avatar out of the specific region. For example, it is assumed that the specific region is configured as one room, and a doorway through which the avatar enters and exits is provided. In this case, the control unit 150 may move the rejected avatar in front of the doorway outside the specific region. Alternatively, the control unit 150 may move the rejected avatar to a region dedicated to rejected avatars. As a result, a user of the rejected avatar can intuitively understand that the entry to the specific region has been rejected. In this manner, the control unit 150 performs control to move the rejected avatar, which is an avatar whose entry has been rejected, to a location different from the specific region. The control unit 150 is an example of control means.

The control unit 150 may move the rejected avatar to a different location according to an attribute of the user who operates the rejected avatar. For example, it is assumed that a virtual office is constructed in a virtual space. In this case, it is assumed that a work area associated to an affiliation is determined in advance for the office. In this case, the control unit 150 may move the rejected avatar to the work area associated to the affiliation of the user who operates the rejected avatar. The present disclosure is not limited thereto, and the control unit 150 may move the rejected avatar to a different location according to a position of the user or a rank of the user determined according to a charge for a system.

The control unit 150 may move the rejected avatar to a different location according to a result of biometric authentication. For example, it is assumed that a virtual office is constructed in a virtual space. Here, it is assumed that the biometric authentication is successful, but the entry of the avatar is rejected because the user does not satisfy a condition. The control unit 150 moves the rejected avatar in this case to a region outside the specific region in the office. In addition, it is assumed that the entry of the avatar is rejected due to a failure in the biometric authentication. The control unit 150 moves the rejected avatar in this case out of the office. In this manner, the control unit 150 may move the rejected avatar to a different location based on whether the user who operates the rejected avatar is a user authenticated by the biometric authentication. As a result, the control unit 150 can exclude a suspicious avatar.

Furthermore, the control unit 150 may change a display form of the avatar according to the result of the biometric authentication. For example, it is assumed that there is a rejected avatar whose entry has been rejected due to a failure in the biometric authentication. At this time, the control unit 150 acquires a face image of the user who operates the rejected avatar. Then, the control unit 150 may synthesize the face image with the rejected avatar. At this time, the control unit 150 may acquire the face image by causing the user terminal 200 of the rejected avatar to perform imaging when the biometric authentication has failed. In a case where a face feature amount is used for the biometric authentication, the control unit 150 may acquire a face image captured when the biometric authentication is performed. As described above, in a case where the user who operates the rejected avatar is a user who has not been authenticated by the biometric authentication, the control unit 150 may synthesize the face image of the user with the rejected avatar. The present disclosure is not limited thereto, and the control unit 150 may color or add characters or symbols to the rejected avatar that has not been authenticated by the biometric authentication.

When moving the rejected avatar, the control unit 150 may cause another avatar to guide the rejected avatar. For example, the control unit 150 may perform control in such a way that the rejected avatar is taken to a location different from the specific region by a security guard avatar. As a result, it is possible to notify another user that there is a suspicious avatar. In this manner, the control unit 150 may perform control to guide the rejected avatar to a location different from the specific region by another avatar.

In a case where there is a rejected avatar, the control unit 150 may notify a user who operates the allowed avatar. For example, the control unit 150 notifies the user who operates the allowed avatar that there is a rejected avatar. In this case, the user of the allowed avatar may input a control instruction for the rejected avatar by using the user terminal 200. For example, the user of the allowed avatar communicates with the user of the rejected avatar through a call, a chat, or the like. As a result, the user of the allowed avatar inputs, to the user terminal 200, the control instruction indicating whether to move the rejected avatar or allow the entry of the rejected avatar to the specific region. The reception unit 110 acquires the control instruction from the user terminal 200. Then, the control unit 150 may control the rejected avatar according to the control instruction. For example, in a case where there is a control instruction to move the rejected avatar, the control unit 150 moves the rejected avatar to a location different from the specific region. Furthermore, for example, in a case where there is a control instruction to allow the entry of the rejected avatar to the specific region, the control unit 150 causes the rejected avatar to enter the specific region.

[Example of Operation of Information Processing Device 101]

Figure 14:
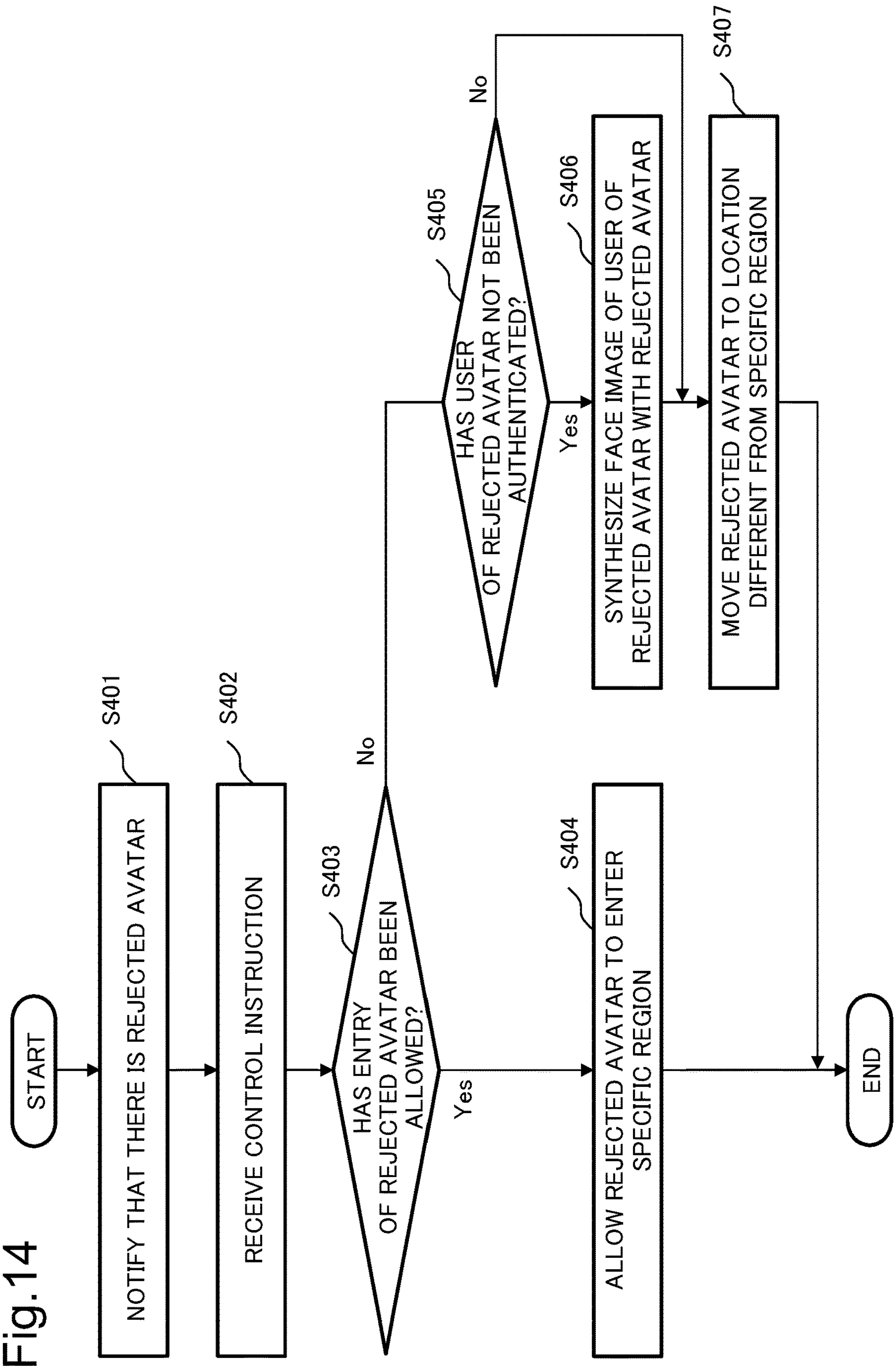
FIG. 14 is a flowchart illustrating an example of the information processing device according to the third example embodiment of the present disclosure.

Next, an example of an operation of the information processing device 101 according to the third example embodiment will be described with reference to FIG. 14. FIG. 14 is a flowchart illustrating an example of the operation of the information processing device 101. Specifically, FIG. 14 illustrates an example of an operation when the information processing device 101 controls the rejected avatar. This operation example shows an operation of the information processing device 101 after the determination unit 140 has rejected the entry of the avatar to the specific region.

The control unit 150 notifies the user of the allowed avatar that there is a rejected avatar (S401). At this time, the control instruction is input by the user of the allowed avatar. The reception unit 110 receives the control instruction (S402). In a case where the entry of the rejected avatar is allowed according to the control instruction ("Yes" in S403), the control unit 150 causes the rejected avatar to enter the specific region (S404).

In a case where the entry of the rejected avatar has been rejected according to the control instruction ("No" in S403) and the user of the rejected avatar has not been authenticated by the biometric authentication ("Yes" in S405), the control unit 150 synthesizes the face image of the user of the rejected avatar with the rejected avatar (S406). In a case where the user of the rejected avatar has been authenticated by the biometric authentication ("No" in S405), the control unit 150 does not execute the processing of S406. Then, the control unit 150 moves the rejected avatar to a location different from the specific region (S407). At this time, the control unit 150 may move the rejected avatar to a different location according to the attribute of the user, or may move the rejected avatar to a different location according to whether the user of the rejected avatar has been authenticated by the biometric authentication.

The control unit 150 does not need to perform all of the above operation examples. For example, the control unit 150 does not have to execute the processings of S405 and S406 among the processings of S401 to S407, or may execute only the processing of S407. The control unit 150 can appropriately combine the respective processings.

As described above, the information processing device 101 according to the third example embodiment may perform control to move the rejected avatar, which is an avatar whose entry has been rejected, to a location different from the specific region. As a result, the information processing device 101 can prevent a user who is not allowed to use the specific region from using the specific region.

Furthermore, in a case where there is a rejected avatar, the information processing device 101 according to the third example embodiment may notify the user who operates the allowed avatar, which is an avatar allowed to enter the specific region, that there is a rejected avatar, receive the control instruction for the rejected avatar from the user terminal by which the allowed avatar is operated, and control the rejected avatar according to the control instruction. For example, it is assumed that the biometric authentication is performed using the face feature amount. In this case, imaging is performed by an imaging device provided in the user terminal. However, there is a possibility that appropriate imaging is not performed due to a failure of the imaging device, and the biometric authentication fails. That is, there is a possibility that the biometric authentication fails even though there is no user's fault. Since the information processing device 101 can control the rejected avatar according to the control instruction from the user who operates the allowed avatar, it is possible to take an appropriate measure even in a case where the biometric authentication fails despite the absence of the user's fault.

Sixth Modification

The control unit 150 may move an avatar that is not the rejected avatar to a location different from the specific region. For example, the control unit 150 may move an avatar that is the allowed avatar and has no action for a certain period of time. The avatar having no action for a certain period of time may be, for example, an avatar that has not moved for a certain period of time or an avatar for which the user has not made an utterance for a certain period of time.

<Application Circumstance Examples>

Next, an example of a circumstance in which the information processing device of the present disclosure is applied will be described. The following description is merely an example, and the circumstance in which the information processing device of the present disclosure is applied is not limited to the following circumstances.

[Circumstance 1]

For example, in a case where a disaster occurs, a disaster control room is set up in order to cooperate with a person at a distant location and share information. In such a case, the user inputs setting information in order to set up the disaster control room in the virtual space. At this time, the setting information includes a condition that only users who are members of the disaster control room can use the setting information. The information processing device sets the specific region based on the setting information. Furthermore, a plurality of users may be divided into a plurality of teams. The information processing device may further set the specific region for each team inside the disaster control room according to the setting information.

Confidential information may be handled in the disaster control room, and in this case, only an avatar of a specific user is allowed to enter the disaster control room (that is, the specific region). Furthermore, the information processing device determines whether the avatar is operated by the specific user by the biometric authentication. That is, the information processing device can ensure strong security.

In addition, the information processing device can set a partial region in the virtual space as the disaster control room. That is, the disaster control room is a part of a sparse space, and is not completely isolated from other regions. Since the allowed avatar can move between the disaster control room and other region, the user of the allowed avatar can also check the state of other users.

[Circumstance 2]

For example, it is assumed that a seminar in which only a specific user can participate is held in the virtual space. In such a case, for example, a user who is the organizer of the seminar inputs the setting information in order to set up a seminar venue in the virtual space. At this time, the setting information includes a condition that only users who can participate in the seminar can use the setting information. For example, it is assumed that the attribute of the user includes a flag indicating a user who paid a participation fee of the seminar. In this case, the setting information includes a condition that only the avatar of the flagged user is allowed to enter the seminar venue. The information processing device sets the specific region based on such setting information. Furthermore, the information processing device may further set a platform for the avatar of the lecturer of the seminar as the specific region. In this case, the specific region is set in the platform in such a way as to allow the avatar of the lecturer of the seminar to enter.

As described above, since the information processing device can set the specific region as described above, it is possible to manage information in such a way that the information is disclosed only to a specific user.

[Circumstance 3]

In the above example, it has been described that the information processing device manages an entry of an avatar for the specific region. This can be read as managing specific information disclosed to the avatar. That is, the information processing device in the present disclosure can also determine whether to disclose the specific information to the avatar.

For example, it is assumed that a whiteboard on which characters and drawings can be written by the user is installed in the virtual space. The information processing device manages disclosure of information described on the whiteboard.

It is assumed that the information processing device 100 in FIG. 5 is applied to Circumstance 3. The region setting unit 121 of the information processing device 100 can set the whiteboard as the specific region. That is, a condition for a user who is allowed to use the whiteboard is set. In this case, the entry/exit detection unit 122 detects that the avatar has attempted to browse the whiteboard or to write on the whiteboard by a user operation. Then, the authentication unit 130 performs the biometric authentication on the user who has attempted to use the whiteboard. In a case where the biometric authentication is successful and the user is a user who is allowed to use the whiteboard, the determination unit 140 allows the use of the whiteboard.

As described above, the information processing device of the present disclosure can also manage disclosure of specific information.

<Example of Hardware Configuration of Information Processing Device>

Figure 15:
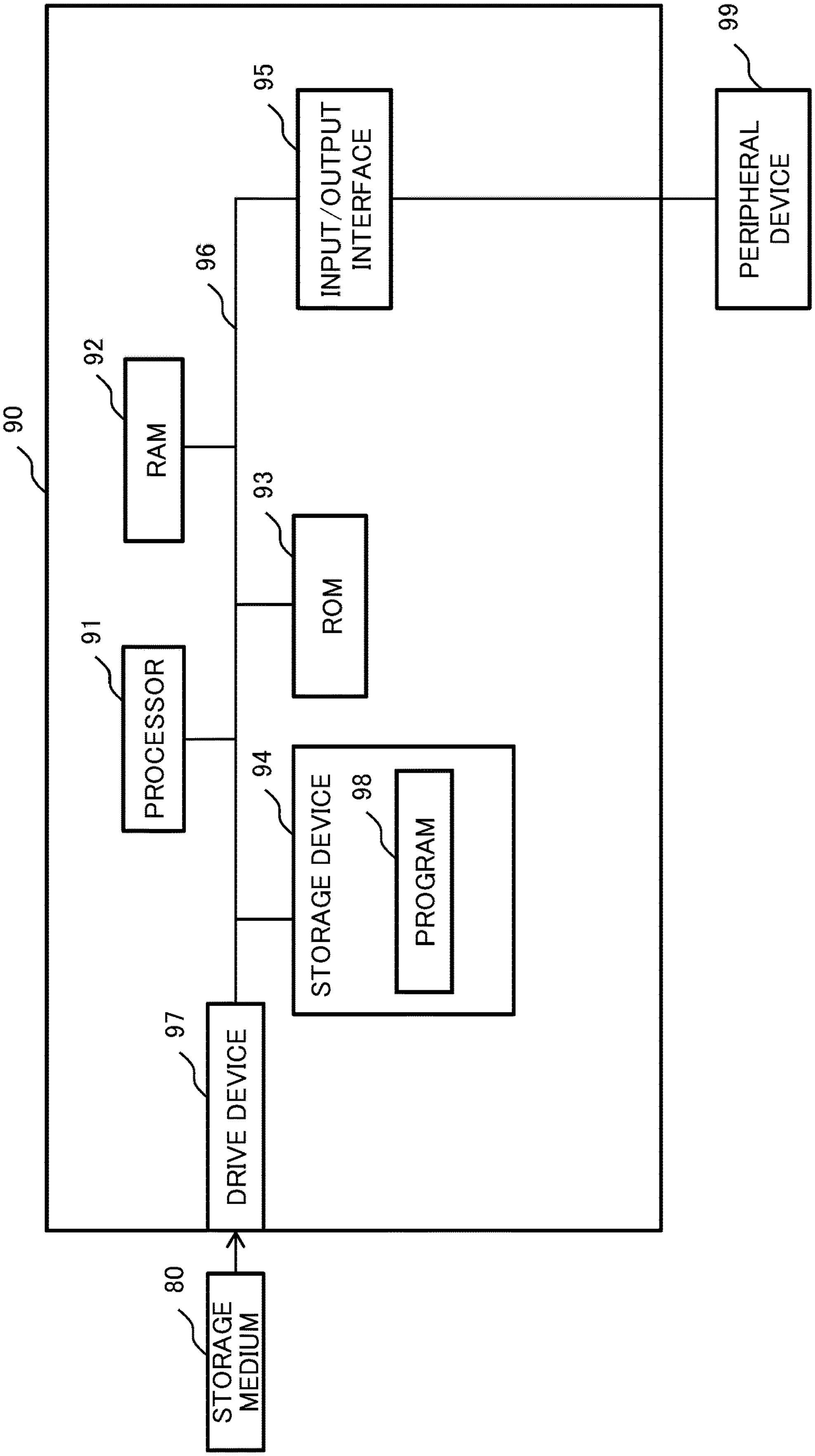
FIG. 15 is a block diagram illustrating an example of a hardware configuration of a computer device that implements the information processing devices according to the first, second, and third example embodiments of the present disclosure.

Hardware implementing the information processing devices of the first, second, and third example embodiments will be described. FIG. 15 is a block diagram illustrating an example of a hardware configuration of a computer device that implements the information processing device according to each embodiment. The information processing device and the information processing method described in each embodiment and each modification are implemented by a computer device 90.

As illustrated in FIG. 15, the computer device 90 includes a processor 91, a random access memory (RAM) 92, a read only memory (ROM) 93, a storage device 94, an input/output interface 95, a bus 96, and a drive device 97. The information processing device may be implemented by a plurality of electric circuits.

The storage device 94 stores a program (computer program) 98. The processor 91 executes the program 98 of the information processing device by using the RAM 92. Specifically, for example, the program 98 includes a program that causes a computer to execute the processing illustrated in FIGS. 4, 7, 8, 10, and 14. The functions of the components of the information processing device are implemented by the processor 91 executing the program 98. The program 98 may be stored in the ROM 93. The program 98 may be recorded in a storage medium 80 and read using the drive device 97, or may be transmitted from an external device (not illustrated) to the computer device 90 via a network (not illustrated).

The input/output interface 95 exchanges data with a peripheral device (a keyboard, a mouse, a display device, or the like) 99. The input/output interface 95 functions as means that acquires or outputs data. The bus 96 connects the components.

There are various modifications of the method of implementing the information processing device. For example, the information processing device can be implemented as a dedicated device. Alternatively, the information processing device can be implemented based on a combination of a plurality of devices.

A processing method in which a program for implementing each component in the function of each example embodiment is recorded in a storage medium, the program recorded in the storage medium is read as a code, and a computer is caused to execute the program also falls within the scope of each example embodiment. That is, a computer-readable storage medium also falls within the scope of each example embodiment. The above-described storage medium in which the program is recorded and the program itself are also included in each example embodiment.

The storage medium is, for example, a floppy (registered trademark) disk, a hard disk, an optical disk, a magneto-optical disk, a compact disc (CD)-ROM, a magnetic tape, a nonvolatile memory card, or a ROM, but is not limited thereto. The program recorded in the storage medium is not limited to a program that performs processing alone, and a program that is operated on an operating system (OS) to execute processing in cooperation with other software and functions of an extension board also falls within the scope of each example embodiment.

While the present invention has been particularly shown and described with reference to the example embodiments thereof, the present invention is not limited to these example embodiments. It will be understood by those of ordinary skill in the art that various changes in form and details may be made therein without departing from the spirit and scope of the present invention as defined by the claims.

The above-described example embodiments and modifications can be appropriately combined.

Some or all of the above-described example embodiments can also be described as the following Supplementary Notes, but are not limited thereto.

<Supplementary Notes>

[Supplementary Note 1]

An information processing device including:

reception means that receives an input of setting information which is information indicating restriction of an entry to a partial region of a virtual space;

region control means that sets, as a specific region, the partial region indicated by the setting information;

authentication means that performs biometric authentication of a user who operates an avatar in a case where the avatar attempts to enter the specific region; and determination means that determines whether to allow the avatar to enter the specific region according to a result of the biometric authentication.

[Supplementary Note 2]

The information processing device according to Supplementary Note 1, in which the setting information includes information indicating a user who is allowed to use the partial region indicated by the setting information, the region control means sets a condition for the user who is allowed to use the specific region based on the setting information, and the determination means allows the avatar to enter the specific region in a case where the user who operates the avatar that attempts to enter the specific region satisfies the condition.

[Supplementary Note 3]

The information processing device according to Supplementary Note 2, in which the condition is set based on information regarding an attribute including at least one of a position or an affiliation of the user, and the determination means allows the avatar to enter the specific region in a case where the attribute of the user who operates the avatar satisfies the condition.

[Supplementary Note 4]

The information processing device according to any one of Supplementary Notes 1 to 3, in which the authentication means performs the biometric authentication of the user who operates the avatar present in the specific region at any given time, and the determination means determines whether to allow the avatar to enter the specific region in response to the biometric authentication.

[Supplementary Note 5]

The information processing device according to any one of Supplementary Notes 1 to 4, further including control means that performs control to move a rejected avatar, which is an avatar whose entry has been rejected by the determination means, to a location different from the specific region.

[Supplementary Note 6]

The information processing device according to Supplementary Note 5, in which the control means performs control to move the rejected avatar to a different location according to an attribute of a user who operates the rejected avatar.

[Supplementary Note 7]

The information processing device according to Supplementary Note 5 or 6, in which the control means performs control to guide the rejected avatar to a location different from the specific region by another avatar.

[Supplementary Note 8]

The information processing device according to any one of Supplementary Notes 5 to 7, in which in a case where there is a rejected avatar, the control means notifies of a user who operates an allowed avatar, which is an avatar allowed to enter the specific region, that there is a rejected avatar, the reception means receives a control instruction for the rejected avatar from a user terminal by which the allowed avatar is operated, and the control means controls the rejected avatar according to the control instruction.

[Supplementary Note 9]

The information processing device according to any one of Supplementary Notes 5 to 8, in which the control means synthesizes a face image of the user with the rejected avatar in a case where the user who operates the rejected avatar has not been authenticated by the biometric authentication.

[Supplementary Note 10]

The information processing device according to any one of Supplementary Notes 5 to 9, in which the control means moves the rejected avatar to a different location based on whether the user who operates the rejected avatar has been authenticated by the biometric authentication.

[Supplementary Note 11]

An information processing method including:

receiving an input of setting information which is information indicating restriction of an entry to a partial region of a virtual space;

setting, as a specific region, the region of the virtual space indicated by the setting information;

performing biometric authentication of a user who operates an avatar in a case where the avatar attempts to enter the specific region; and determining whether to allow the avatar to enter the specific region according to a result of the biometric authentication.

[Supplementary Note 12]

The information processing method according to Supplementary Note 11, in which the setting information includes information indicating a user who is allowed to use the partial region indicated by the setting information, and the information processing method further includes:

setting a condition for the user who is allowed to use the specific region based on the setting information; and allowing the avatar to enter the specific region in a case where the user who operates the avatar that attempts to enter the specific region satisfies the condition.

[Supplementary Note 13]

The information processing method according to Supplementary Note 12, in which the condition is set based on information regarding an attribute including at least one of a position or an affiliation of the user, and the information processing method further includes allowing the avatar to enter the specific region in a case where the attribute of the user who operates the avatar satisfies the condition.

[Supplementary Note 14]

The information processing method according to any one of Supplementary Notes 11 to 13, further including:

performing the biometric authentication of the user who operates the avatar present in the specific region at any given time; and determining whether to allow the avatar to enter the specific region in response to the biometric authentication.

[Supplementary Note 15]

The information processing method according to any one of Supplementary Notes 11 to 14, further including control means that performs control to move a rejected avatar, which is an avatar whose entry has been rejected, to a location different from the specific region.

[Supplementary Note 16]

The information processing method according to Supplementary Note 15, further including performing control to move the rejected avatar to a different location according to an attribute of a user who operates the rejected avatar.

[Supplementary Note 17]

The information processing method according to Supplementary Note 15 or 16, further including performing control to guide the rejected avatar to a location different from the specific region by another avatar.

[Supplementary Note 18]

The information processing method according to any one of Supplementary Notes 15 to 17, further including:

notifying, in a case where there is a rejected avatar, of a user who operates an allowed avatar, which is an avatar allowed to enter the specific region, that there is a rejected avatar;

receiving a control instruction for the rejected avatar from a user terminal by which the allowed avatar is operated; and controlling the rejected avatar according to the control instruction.

[Supplementary Note 19]

The information processing method according to any one of Supplementary Notes 15 to 18, further including synthesizing a face image of the user with the rejected avatar in a case where the user who operates the rejected avatar has not been authenticated by the biometric authentication.

[Supplementary Note 20]

The information processing method according to any one of Supplementary Notes 15 to 19, further including moving the rejected avatar to a different location based on whether the user who operates the rejected avatar has been authenticated by the biometric authentication.

[Supplementary Note 21]

A computer-readable storage medium storing a program for causing a computer to execute processing of:

receiving an input of setting information which is information indicating restriction of an entry to a partial region of a virtual space;

setting, as a specific region, the region of the virtual space indicated by the setting information;

performing biometric authentication of a user who operates an avatar in a case where the avatar attempts to enter the specific region; and determining whether to allow the avatar to enter the specific region according to a result of the biometric authentication.

[Supplementary Note 22]

The computer-readable storage medium according to Supplementary Note 21, in which the setting information includes information indicating a user who is allowed to use the partial region indicated by the setting information, in the setting, a condition for the user who is allowed to use the specific region is set based on the setting information, and in the determining, the avatar is allowed to enter the specific region in a case where the user who operates the avatar that attempts to enter the specific region satisfies the condition.

[Supplementary Note 23]

The computer-readable storage medium according to Supplementary Note 22, in which the condition is set based on information regarding an attribute including at least one of a position or an affiliation of the user, and in the determining, the avatar is allowed to enter the specific region in a case where the attribute of the user who operates the avatar satisfies the condition.

[Supplementary Note 24]

The computer-readable storage medium according to any one of Supplementary Notes 21 to 23, in which in the performing of the biometric authentication, the biometric authentication of the user who operates the avatar present in the specific region is performed at any given time, and in the determining, whether to allow the avatar to enter the specific region is determined in response to the biometric authentication.

[Supplementary Note 25]

The computer-readable storage medium according to any one of Supplementary Notes 21 to 24, in which the computer is further caused to execute processing of performing control to move a rejected avatar, which is an avatar whose entry has been rejected, to a location different from the specific region.

[Supplementary Note 26]

The computer-readable storage medium according to Supplementary Note 25, in which in the performing of the control, the control is performed to move the rejected avatar to a different location according to an attribute of a user who operates the rejected avatar.

[Supplementary Note 27]

The computer-readable storage medium according to Supplementary Note 25 or 26, in which in the performing of the control, the control is performed to guide the rejected avatar to a location different from the specific region by another avatar.

[Supplementary Note 28]

The computer-readable storage medium according to any one of Supplementary Notes 25 to 27, in which in the performing of the control, in a case where there is a rejected avatar, a user who operates an allowed avatar, which is an avatar allowed to enter the specific region, is notified that there is a rejected avatar, in the receiving, a control instruction for the rejected avatar is received from a user terminal by which the allowed avatar is operated, and in the performing of the control, the rejected avatar is controlled according to the control instruction.

[Supplementary Note 29]

The computer-readable storage medium according to any one of Supplementary Notes 25 to 28, in which in the performing of the control, a face image of the user is synthesized with the rejected avatar in a case where the user who operates the rejected avatar has not been authenticated by the biometric authentication.

[Supplementary Note 30]

The computer-readable storage medium according to any one of Supplementary Notes 25 to 29, in which in the performing of the control, the rejected avatar is moved to a different location based on whether the user who operates the rejected avatar has been authenticated by the biometric authentication.

REFERENCE SIGNS LIST

100, 101 Information processing device
110 Reception unit
120 Region control unit
121 Region setting unit
122 Entry/exit detection unit
130 Authentication unit
131 Biometric information acquisition unit
132 Authentication processing unit
140 Determination unit
150 Control unit
200 User terminal

What is claimed is:

1. An information processing device comprising:

at least one memory storing a computer program; and at least one processor configured to execute the computer program to:

receive setting information indicating restriction of an entry to a partial region of a virtual space;

set, as a specific region, the partial region indicated by the setting information;

obtain age information of a user who operates an avatar;

obtain current date-and-time information; and determine whether to allow the avatar to enter the specific region based on whether the age information of the user satisfies a first condition, among one or more conditions and based on whether the current date-and-time information satisfies a second condition among the one or more conditions, wherein the setting information includes date-and-time information indicating a period during which the entry to the partial region is restricted, and wherein the second condition is satisfied when the current date-and-time information is within the period indicated by the date-and-time information.

2. The information processing device according to claim 1, wherein the setting information includes information indicating a user who is allowed to use the partial region indicated by the setting information, the processor is configured to execute the computer program to set the one or more conditions for the user who is allowed to use the specific region based on the setting information, and allow the avatar to enter the specific region in a case where the user who operates the avatar that attempts to enter the specific region satisfies the one or more conditions.

3. The information processing device according to claim 2, wherein the one or more conditions is set based on information regarding an attribute including at least one of a position or an affiliation of the user, and the processor is configured to execute the computer program to allow the avatar to enter the specific region in a case where the attribute of the user who operates the avatar satisfies the one or more conditions.

4. The information processing device according to claim 1, wherein the processor is configured to execute the computer program to perform biometric authentication of the user who operates the avatar present in the specific region at any given time, and determine whether to allow the avatar to enter the specific region in response to the biometric authentication.

5. The information processing device according to claim 1, wherein the processor is configured to execute the computer program to perform control to move a rejected avatar, which is an avatar whose entry has been rejected, to a location different from the specific region.

6. The information processing device according to claim 5, wherein the processor is configured to execute the computer program to perform control to move the rejected avatar to a different location according to an attribute of a user who operates the rejected avatar.

7. The information processing device according to claim 5, wherein the processor is configured to execute the computer program to perform control to guide the rejected avatar to a location different from the specific region by another avatar.

8. The information processing device according to claim 5, wherein the processor is configured to execute the computer program to, in a case where there is a rejected avatar, notify of a user who operates an allowed avatar, which is an avatar allowed to enter the specific region, that there is a rejected avatar, receive a control instruction for the rejected avatar from a user terminal by which the allowed avatar is operated, and control the rejected avatar according to the control instruction.

9. The information processing device according to claim 5, wherein the processor is configured to execute the computer program to synthesize a face image of the user with the rejected avatar in a case where the user who operates the rejected avatar has not been authenticated by the biometric authentication.

10. The information processing device according to claim 5, wherein the processor is configured to execute the computer program to move the rejected avatar to a different location based on whether the user who operates the rejected avatar has been authenticated by the biometric authentication.

11. The information processing device according to claim 1, wherein the processor is configured to execute the computer program to:

obtain payment-related information of the user; and determine whether to allow the avatar to enter the specific region further based on whether the payment-related information satisfies a third condition among the one or more conditions.

12. An information processing method comprising:

receiving setting information indicating restriction of an entry to a partial region of a virtual space;

setting, as a specific region, the partial region indicated by the setting information;

obtaining age information of a user who operates an avatar in a case where the avatar attempts to enter the specific region;

obtaining current date-and-time information; and determining whether to allow the avatar to enter the specific region based on whether the age information of the user satisfies a first condition, among one or more conditions and based on whether the current date-and-time information satisfies a second condition among the one or more conditions, wherein the setting information includes date-and-time information indicating a period during which the entry to the partial region is restricted, and wherein the second condition is satisfied when the current date-and-time information is within the period indicated by the date-and-time information.

13. The information processing method according to claim 12, wherein the setting information includes information indicating a user who is allowed to use the partial region indicated by the setting information, and the information processing method further comprises:

setting the one or more conditions for the user who is allowed to use the specific region based on the setting information; and allowing the avatar to enter the specific region in a case the user who operates the avatar that attempts to enter the specific region satisfies the one or more conditions.

14. The information processing method according to claim 13, wherein the one or more conditions is set based on information regarding an attribute including at least one of a position or an affiliation of the user, and the information processing method further comprises allowing the avatar to enter the specific region in a case where the attribute of the user who operates the avatar satisfies the one or more conditions.

15. The information processing method according to claim 12, further comprising:

performing biometric authentication of the user who operates the avatar present in the specific region at any given time; and determining whether to allow the avatar to enter the specific region in response to the biometric authentication.

16. The information processing method according to claim 12, further comprising performing control to move a rejected avatar, which is an avatar whose entry has been rejected, to a location different from the specific region.

17. A non-transitory computer-readable storage medium storing a program for causing a computer to execute processing of:

receiving setting information indicating restriction of an entry to a partial region of a virtual space;

setting, as a specific region, the partial region indicated by the setting information;

obtaining age information of a user who operates an avatar in a case where the avatar attempts to enter the specific region;

determining whether to allow the avatar to enter the specific region based on whether the age information of the user satisfies a first condition among one or more conditions and based on whether the current date-and-time information satisfies a second condition among the one or more conditions, wherein the setting information includes date-and-time information indicating a period during which the entry to the partial region is restricted, and wherein the second condition is satisfied when the current date-and-time information is within the period indicated by the date-and-time information.

18. The non-transitory computer-readable storage medium according to claim 17, wherein the setting information includes information indicating a user who is allowed to use the partial region indicated by the setting information, in the setting, the one or more conditions for the user who is allowed to use the specific region is set based on the setting information, and in the determining, the avatar is allowed to enter the specific region in a case where the user who operates the avatar that attempts to enter the specific region satisfies the one or more conditions.

19. The non-transitory computer-readable storage medium according to claim 18, wherein the one or more conditions is set based on information regarding an attribute including at least one of a position or an affiliation of the user, and in the determining, the avatar is allowed to enter the specific region in a case where the attribute of the user who operates the avatar satisfies the one or more conditions.

20. The non-transitory computer-readable storage medium according to claim 17, wherein in performing of the biometric authentication, the biometric authentication of the user who operates the avatar present in the specific region is performed at any given time, and in the determining, whether to allow the avatar to enter the specific region is determined in response to the biometric authentication.

21. The non-transitory computer-readable storage medium according to claim 17, wherein the computer is further caused to execute processing of performing control to move a rejected avatar, which is an avatar whose entry has been rejected, to a location different from the specific region.

* * * * *